(12) United States Patent
Harrison et al.

(10) Patent No.: US 7,922,083 B2
(45) Date of Patent: Apr. 12, 2011

(54) PAYMENT PROGRAMS FOR HEALTHCARE PLANS

(76) Inventors: Sarah E. Harrison, New York, NY (US); Jason S. Jagatic, Hoboken, NJ (US); Dana J. Klaboe, Brooklyn, NY (US); Leigh R. Malnati, Mountain Lakes, NJ (US)

(*) Notice: Subject to any disclaimer, the term of this patent is extended or adjusted under 35 U.S.C. 154(b) by 653 days.

(21) Appl. No.: 11/461,389

(22) Filed: Jul. 31, 2006

(65) Prior Publication Data

US 2007/0194109 A1      Aug. 23, 2007

Related U.S. Application Data

(63) Continuation-in-part of application No. 10/904,639, filed on Nov. 19, 2004, now Pat. No. 7,213,750, and a continuation-in-part of application No. 11/275,401, filed on Dec. 29, 2005, application No. 11/461,389, filed on Jul. 31, 2006.

(60) Provisional application No. 60/697,514, filed on Jul. 8, 2005, provisional application No. 60/523,812, filed on Nov. 19, 2003, provisional application No. 60/541,548, filed on Feb. 3, 2004.

(51) Int. Cl.
*G06K 5/00* (2006.01)
(52) U.S. Cl. ..................... 235/381; 235/380
(58) Field of Classification Search ............. 235/375, 235/380, 381, 382, 383, 492, 486; 705/2, 705/14, 35
See application file for complete search history.

(56) References Cited

U.S. PATENT DOCUMENTS

| | | | |
|---|---|---|---|
| 4,491,725 A | 1/1985 | Pritchard |
| 4,713,761 A | 12/1987 | Sharpe et al. |
| 4,858,121 A | 8/1989 | Barber et al. |
| 4,916,611 A | 4/1990 | Doyle et al. |
| 5,235,507 A | 8/1993 | Sackler et al. |
| 5,301,105 A | 4/1994 | Cummings, Jr. |
| 5,532,464 A | 7/1996 | Josephson et al. |
| 5,550,734 A | 8/1996 | Tarter et al. |
| 5,583,760 A | 12/1996 | Klesse |
| 5,704,044 A | 12/1997 | Tarter et al. |
| 5,740,425 A | 4/1998 | Povilus |
| 5,826,243 A | 10/1998 | Musmanno et al. |
| 5,832,447 A | 11/1998 | Rieker et al. |
| 5,857,079 A | 1/1999 | Claus et al. |
| 5,873,069 A | 2/1999 | Reuhl et al. |
| 5,878,141 A | 3/1999 | Daly et al. |

(Continued)

OTHER PUBLICATIONS

Schoenberg, "Internet Based Repository of Medical Records That Retains Patient Confidentiality," *British Medical Journal*, vol. 321, Issue 7270, pp. 1199-1203 (Nov. 11, 2000).

(Continued)

*Primary Examiner* — Thien M Le
(74) *Attorney, Agent, or Firm* — Sterne, Kessler, Goldstein & Fox, P.L.L.C.

(57) ABSTRACT

The invention is a computer-implemented method and system to facilitate a purchase utilizing a tax-advantaged account. A request for payment for an item is received from a requester. A determination is made whether the item qualifies for pre-tax treatment. If the item qualifies for pre-tax treatment at least a partial payment amount for the item is determined. The tax-advantaged account is debited for at least a portion of the purchasing amount of the item based on the payment authorization; and the at least partial payment amount for the item is transmitted to an account of the requestor.

20 Claims, 14 Drawing Sheets

U.S. PATENT DOCUMENTS

| | | |
|---|---|---|
| 5,903,830 A | 5/1999 | Joao et al. |
| 5,930,759 A | 7/1999 | Moore et al. |
| 5,945,653 A | 8/1999 | Walker et al. |
| 6,012,035 A | 1/2000 | Freeman, Jr. et al. |
| 6,042,005 A | 3/2000 | Basile et al. |
| 6,108,641 A | 8/2000 | Kenna et al. |
| 6,112,986 A | 9/2000 | Berger et al. |
| 6,154,732 A | 11/2000 | Tarbox |
| 6,208,973 B1 | 3/2001 | Boyer et al. |
| 6,249,772 B1 | 6/2001 | Walker et al. |
| 6,292,786 B1 | 9/2001 | Deaton et al. |
| 6,339,766 B1 | 1/2002 | Gephart |
| 6,341,265 B1 | 1/2002 | Provost et al. |
| 6,343,271 B1 | 1/2002 | Peterson et al. |
| 6,343,279 B1 | 1/2002 | Bissonette et al. |
| 6,353,811 B1 | 3/2002 | Weissman |
| 6,386,450 B1 | 5/2002 | Ogasawara |
| 6,394,341 B1 | 5/2002 | Mäkipää et al. |
| 6,418,441 B1 | 7/2002 | Call |
| 6,422,462 B1 | 7/2002 | Cohen |
| 6,442,526 B1 | 8/2002 | Vance et al. |
| 6,442,532 B1 | 8/2002 | Kawan |
| 6,488,205 B1 | 12/2002 | Jacobson |
| 6,543,683 B2 | 4/2003 | Hoffman |
| 6,594,640 B1 | 7/2003 | Postrel |
| 6,601,761 B1 | 8/2003 | Katis |
| 6,615,190 B1 | 9/2003 | Slater |
| 6,637,649 B2 | 10/2003 | Walsh |
| 6,662,999 B1 | 12/2003 | Vancour et al. |
| 6,671,358 B1 | 12/2003 | Seidman et al. |
| 6,749,114 B2 | 6/2004 | Madani |
| 6,776,332 B2 | 8/2004 | Allen et al. |
| 6,820,058 B2 | 11/2004 | Wood et al. |
| 6,820,059 B2 | 11/2004 | Wood et al. |
| 6,879,959 B1 | 4/2005 | Chapman et al. |
| 6,898,598 B2 | 5/2005 | Himmel et al. |
| 6,932,268 B1 | 8/2005 | McCoy et al. |
| 6,947,900 B2 | 9/2005 | Giordano, III et al. |
| 6,999,943 B1 | 2/2006 | Johnson et al. |
| 7,039,593 B2 | 5/2006 | Sager |
| 7,072,842 B2 | 7/2006 | Provost et al. |
| 7,097,098 B2 | 8/2006 | Roberts |
| 7,104,443 B1 | 9/2006 | Paul et al. |
| 7,133,840 B1 | 11/2006 | Kenna et al. |
| 7,158,955 B2 | 1/2007 | Diveley et al. |
| 7,174,302 B2 | 2/2007 | Patricelli et al. |
| 7,197,468 B1 | 3/2007 | Patricelli et al. |
| 7,213,750 B1 * | 5/2007 | Barnes et al. ............... 235/381 |
| 7,233,942 B2 | 6/2007 | Nye |
| 7,249,097 B2 | 7/2007 | Hutchison et al. |
| 7,249,112 B2 | 7/2007 | Berardi et al. |
| 7,263,493 B1 | 8/2007 | Provost et al. |
| 7,268,667 B2 | 9/2007 | Beenau et al. |
| 7,268,668 B2 | 9/2007 | Beenau et al. |
| 7,333,937 B2 | 2/2008 | Baldwin, Jr., et al. |
| 7,346,522 B1 | 3/2008 | Baylor et al. |
| 7,380,707 B1 | 6/2008 | Fredman |
| 7,392,224 B1 | 6/2008 | Bauer et al. |
| 7,434,729 B2 | 10/2008 | Cracchiolo et al. |
| 7,493,266 B2 | 2/2009 | Gupta |
| 7,499,875 B1 | 3/2009 | May et al. |
| 7,566,000 B2 | 7/2009 | Agostino et al. |
| 7,624,026 B2 | 11/2009 | DiPiero et al. |
| 7,650,308 B2 * | 1/2010 | Nguyen et al. ............... 705/40 |
| 2001/0014873 A1 | 8/2001 | Henderson et al. |
| 2001/0034618 A1 | 10/2001 | Kessler et al. |
| 2002/0016764 A1 | 2/2002 | Hoffman |
| 2002/0019885 A1 | 2/2002 | Sleeper |
| 2002/0035529 A1 | 3/2002 | Tooke |
| 2002/0087444 A1 | 7/2002 | DiPiero et al. |
| 2002/0099659 A1 | 7/2002 | Swentor |
| 2002/0116206 A1 | 8/2002 | Chatani |
| 2002/0128879 A1 | 9/2002 | Spears |
| 2002/0147678 A1 | 10/2002 | Drunsic |
| 2002/0174030 A1 | 11/2002 | Praisner et al. |
| 2002/0198831 A1 | 12/2002 | Patricelli et al. |
| 2002/0198833 A1 | 12/2002 | Wohlstadter |
| 2003/0018567 A1 | 1/2003 | Flitcroft et al. |
| 2003/0023498 A1 | 1/2003 | Benton |
| 2003/0023549 A1 | 1/2003 | Armes et al. |
| 2003/0033272 A1 | 2/2003 | Himmel et al. |
| 2003/0061153 A1 | 3/2003 | Birdsong et al. |
| 2003/0061358 A1 | 3/2003 | Piazza et al. |
| 2003/0065561 A1 | 4/2003 | Brown et al. |
| 2003/0069760 A1 | 4/2003 | Gelber |
| 2003/0088487 A1 | 5/2003 | Cheng et al. |
| 2003/0097331 A1 | 5/2003 | Cohen |
| 2003/0119554 A1 | 6/2003 | Horn |
| 2003/0126094 A1 | 7/2003 | Fisher et al. |
| 2003/0130948 A1 | 7/2003 | Algiene et al. |
| 2003/0135459 A1 | 7/2003 | Abelman et al. |
| 2003/0187695 A1 | 10/2003 | Drennan |
| 2003/0195769 A1 | 10/2003 | Francis |
| 2003/0195773 A1 | 10/2003 | Mahaffey |
| 2003/0200118 A1 | 10/2003 | Lee et al. |
| 2003/0216997 A1 | 11/2003 | Cohen |
| 2003/0225678 A1 | 12/2003 | Understein |
| 2004/0010449 A1 | 1/2004 | Berardi et al. |
| 2004/0010462 A1 | 1/2004 | Moon et al. |
| 2004/0049425 A1 | 3/2004 | Bakker et al. |
| 2004/0083183 A1 | 4/2004 | Hardesty et al. |
| 2004/0098328 A1 | 5/2004 | Grant et al. |
| 2004/0098351 A1 | 5/2004 | Duke |
| 2004/0117302 A1 | 6/2004 | Weichert et al. |
| 2004/0138999 A1 | 7/2004 | Friedman et al. |
| 2004/0238622 A1 | 12/2004 | Freiberg |
| 2004/0243464 A1 | 12/2004 | Beck |
| 2004/0249745 A1 | 12/2004 | Baaren |
| 2005/0015280 A1 | 1/2005 | Gabel et al. |
| 2005/0027607 A1 | 2/2005 | Pearson |
| 2005/0033677 A1 | 2/2005 | Birdsong et al. |
| 2005/0038740 A1 | 2/2005 | Ogilvie |
| 2005/0043992 A1 | 2/2005 | Cohagan et al. |
| 2005/0065873 A1 | 3/2005 | Hendrickson et al. |
| 2005/0075931 A1 | 4/2005 | Pearson |
| 2005/0080692 A1 | 4/2005 | Padam et al. |
| 2005/0098621 A1 | 5/2005 | de Sylva |
| 2005/0102181 A1 | 5/2005 | Scroggie et al. |
| 2005/0144071 A1 | 6/2005 | Monahan et al. |
| 2005/0144074 A1 | 6/2005 | Fredregill et al. |
| 2005/0256794 A1 | 11/2005 | Colby |
| 2005/0261968 A1 * | 11/2005 | Randall et al. ............... 705/16 |
| 2005/0288964 A1 | 12/2005 | Lutzen et al. |
| 2006/0027647 A1 | 2/2006 | Deane et al. |
| 2006/0036523 A1 | 2/2006 | Stover et al. |
| 2006/0064332 A1 | 3/2006 | Schoenbaum et al. |
| 2006/0076400 A1 | 4/2006 | Fletcher |
| 2006/0080144 A1 | 4/2006 | Goel et al. |
| 2006/0085335 A1 | 4/2006 | Crawford et al. |
| 2006/0113376 A1 | 6/2006 | Reed et al. |
| 2006/0143052 A1 | 6/2006 | Fotsch et al. |
| 2006/0149595 A1 | 7/2006 | Williams et al. |
| 2006/0149670 A1 * | 7/2006 | Nguyen et al. ............... 705/39 |
| 2006/0167720 A1 | 7/2006 | Harrison et al. |
| 2006/0173777 A1 | 8/2006 | Torres et al. |
| 2006/0253324 A1 | 11/2006 | Miller |
| 2006/0277075 A1 | 12/2006 | Salwan |
| 2006/0287914 A1 | 12/2006 | Shelley |
| 2007/0007335 A1 | 1/2007 | Cracchiolo et al. |
| 2007/0011025 A1 | 1/2007 | Cracchiolo et al. |
| 2007/0011088 A1 | 1/2007 | Cracchiolo et al. |
| 2007/0011089 A1 | 1/2007 | DeSchryver |
| 2007/0023504 A1 | 2/2007 | Blankenship et al. |
| 2007/0033070 A1 | 2/2007 | Beck et al. |
| 2007/0106607 A1 | 5/2007 | Seib et al. |
| 2007/0119920 A1 | 5/2007 | Hogg et al. |
| 2007/0168279 A1 | 7/2007 | D'Angelo |
| 2007/0175985 A1 | 8/2007 | Barnes et al. |
| 2007/0179813 A1 | 8/2007 | Darling |
| 2007/0185799 A1 | 8/2007 | Harrison et al. |
| 2007/0185800 A1 * | 8/2007 | Harrison et al. ............... 705/36 T |
| 2007/0185801 A1 * | 8/2007 | Harrison et al. ............... 705/36 T |
| 2007/0185802 A1 | 8/2007 | Harrison et al. |
| 2007/0185803 A1 * | 8/2007 | Harrison et al. ............... 705/36 T |
| 2007/0194108 A1 * | 8/2007 | Kalappa et al. ............... 235/381 |
| 2007/0194109 A1 * | 8/2007 | Harrison et al. ............... 235/381 |
| 2007/0203757 A1 | 8/2007 | Dibiasi et al. |

| | | | |
|---|---|---|---|
| 2007/0265961 | A1 | 11/2007 | Shah et al. |
| 2008/0011820 | A1 | 1/2008 | Brown et al. |
| 2008/0110971 | A1 | 5/2008 | Pover et al. |
| 2008/0156868 | A1 | 7/2008 | Slen et al. |
| 2008/0179395 | A1 | 7/2008 | Dixon et al. |
| 2008/0195423 | A1 | 8/2008 | Baylor et al. |
| 2008/0210751 | A1 | 9/2008 | Kim |
| 2010/0070409 | A1 | 3/2010 | Harrison et al. |

OTHER PUBLICATIONS

Alonso, G. et al., "Enhancing the Fault Tolerance of Workflow Management Systems," *IEEE Concurrency*, pp. 74-81 (Jul.-Sep. 2000).
Chan et al., U.S. Appl. No. 11/674,437, filed Feb. 13, 2007, entitled "Methods, Systems, and Computer Program Products for Promoting Healthcare Information Technologies to Card Members".
Haase et al., U.S. Appl. No. 11/770,367, filed Jun. 28, 2007, entitled "Universal Rollover Account".
Harrison et al., U.S. Appl. No. 11/698,955, filed Jan. 29, 2007, entitled "Filtered Healthcare Payment Card Linked to Tax-Advantaged Accounts".
Jagatic et al., U.S. Appl. No. 11/561,326, filed Dec. 17, 2006, entitled "Variable Revenue Sharing for Multiple Account Payment Instruments".
Jagatic et al., U.S. Appl. No. 11/675,478, filed Feb. 15, 2007, entitled "Transmission and Capture of Line-Item-Detail to Assist in Transaction Substantiation and Matching".
Keck et al., U.S. Appl. No. 11/675,438, filed Feb. 15, 2007, entitled "Practice Management System (PMS) Integration".
Keck et al., U.S. Appl. No. 11/675,456, filed Feb. 15, 2007, entitled "Practice Management System (PMS) Integration".
Keck et al., U.S. Appl. No. 11/768,708, filed Jun. 26, 2007, entitled "Accelerated Payments for Health Care Plans".
Breitkopf, D., "Card Issuers Jacking Up Phone Fees," American Banker, SourceMedia, Inc., Highbeam Research, printed Aug. 28, 2010 from <http://www.highbeam.com>, 2 pages (Publication Date: Jun. 30, 2003).
Office Communication, dated Aug. 31, 2010, for U.S. Appl. No. 11/461,396, filed Jul. 31, 2006, 16 pages.
Office Communication, dated Sep. 1, 2010, for U.S. Appl. No. 11/561,326, filed Nov. 17, 2006, 7 pages.
GAL-OR, E., "The profitability of vertical mergers between hospitals and physician practices," *Journal of Health Economics*, vol. 18, Issue 5, pp. 623-654 (Oct. 1999).
Office Communication, dated Sep. 28, 2010, for U.S. Appl. No. 11/275,403, filed Dec. 29, 2005, 15 pages.
Office Communication, dated Sep. 10, 2010, for U.S. Appl. No. 11/461,394, filed Jul. 31, 2006, 13 pages.
Office Communication, dated Oct. 12, 2010, for U.S. Appl. No. 12/558,386, filed Sep. 1, 2009, 19 pages.
Office Communication, dated Nov. 4, 2010, for U.S. Appl. No. 11/461,374, filed Jul. 31, 2006, 17 pages.
Office Communication, dated Oct. 19, 2010, for U.S. Appl. No. 11/675,478, filed Feb. 15, 2007, 9 pages.
Bell, A., "Web Sites Push Medical Services Shopping. (Brief Article)," National Underwriter Property & Casualty-Risk & Benefits Management, printed from http://www.highbeam.com/doc/1G1-65106694.html, 4 pages (Aug. 21, 2000).
"Cybear Group Reports Third Quarter 2001 Results of Operations," Business Editors & Health/Medical/Technology Writers, Business Wire, New York, p. 1 (Oct. 25, 2001).
Fisher, Jean P., "Cary, N.C., Medical Technology Firm May Get Boost from Doctors' Endorsement," Knight Ridder Tribune Business News, Washington, p. 1 (Nov. 13, 2003).
GAL-OR, E., "The profitability of vertical mergers between hospitals and physician practices," Journal of Health Economics, vol. 18, Issue 5, pp. 623-624 (Oct. 1999).
"Health Savings Custodial Account Agreement," Trust Administrators, Inc., 1970 Broadway, Suite 1140, Oakland, California, downloaded from www.trustadmin.com/public_html/graphics/CustodialAgreement.pdf, 3 pages.
Richardson, P., "Online broker woos real estate agents; Amerihall's fees lower than those of brick-and-mortar firms," Highbeam Research, printed from http:www.highbeam.com/doc/IG1-66668508.html, 4 pages (Oct. 30, 2000).
Ruess, "Court Snarls MTF Claims Payment Now in Limbo"; [All Editions], Trenton Bureau, The Record, Bergen County, N.J.: Feb. 24, 1994, p. a.01.
Office Communication, dated Mar. 10, 2009, for U.S. Appl. No. 11/275,399, filed Dec. 29, 2005, 6 pages.
Office Communication, dated Oct. 5, 2009, for U.S. Appl. No. 11/275,399, filed Dec. 29, 2005, 9 pages.
Office Communication, dated Sep. 27, 2007, for U.S. Appl. No. 11/275,403, filed Dec. 29, 2005, 7 pages.
Office Communication, dated Mar. 12, 2008, for U.S. Appl. No. 11/275,403, filed Dec. 29, 2005, 14 pages.
Office Communication, dated Jun. 13, 2008, for U.S. Appl. No. 11/275,403, filed Dec. 29, 2005, 11 pages.
Office Communication, dated Dec. 12, 2008, for U.S. Appl. No. 11/275,403, filed Dec. 29, 2005, 11 pages.
Office Communication, dated Jun. 11, 2009, for U.S. Appl. No. 11/275,403, filed Dec. 29, 2005, 12 pages.
Office Communication, dated Nov. 24, 2009, for U.S. Appl. No. 11/275,403, filed Dec. 29, 2005, 7 pages.
Office Communication, dated Mar. 26, 2010, for U.S. Appl. No. 11/275,403, filed Dec. 29, 2005, 16 pages.
Office Communication, dated Oct. 6, 2006, for U.S. Appl. No. 11/275,405, filed Dec. 29, 2005, 5 pages.
Office Communication, dated May 1, 2007, for U.S. Appl. No. 11/275,405, filed Dec. 29, 2005, 11 pages.
Office Communication, dated Nov. 13, 2007, for U.S. Appl. No. 11/275,405, filed Dec. 29, 2005, 11 pages.
Notice of Allowance, dated Jun. 12, 2008, for U.S. Appl. No. 11/275,405, filed Dec. 29, 2005, 7 pages.
Office Communication, dated Feb. 26, 2009, for U.S. Appl. No. 11/381,641, filed May 4, 2006, 12 pages.
Notice of Allowance, dated Aug. 6, 2009, for U.S. Appl. No. 11/381,641, filed May 4, 2006, 6 pages.
Notice of Allowance, dated Nov. 30, 2009, for U.S. Appl. No. 11/381,641, filed May 4, 2006, 7 pages.
Office Communication, dated Jun. 4, 2010, for U.S. Appl. No. 11/381,641, filed May 4, 2006, 6 pages.
Office Communication, dated Mar. 17, 2010, for U.S. Appl. No. 11/461,356, filed Jul. 31, 2006, 13 pages.
Office Communication, dated Aug. 5, 2010, for U.S. Appl. No. 11/461,356, filed Jul. 31, 2006, 22 pages.
Office Communication, dated Sep. 2, 2008, for U.S. Appl. No. 11/461,365, filed Jul. 31, 2006, 7 pages.
Office Communication, dated Feb. 23, 2009, for U.S. Appl. No. 11/461,365, filed Jul. 31, 2006, 8 pages.
Office Communication, dated Jul. 14, 2009, for U.S. Appl. No. 11/461,365, filed Jul. 31, 2006, 7 pages.
Office Communication, dated Apr. 8, 2010, for U.S. Appl. No. 11/461,365, filed Jul. 31, 2006, 9 pages.
Office Communication, dated Sep. 29, 2008, for U.S. Appl. No. 11/461,374, filed Jul. 31, 2006, 7 pages.
Office Communication, dated Feb. 26, 2009, for U.S. Appl. No. 11/461,374, filed Jul. 31, 2006, 8 pages.
Office Communication, dated Jul. 15, 2009, for U.S. Appl. No. 11/461,374, filed Jul. 31, 2006, 11 pages.
Office Communication, dated Dec. 1, 2009, for U.S. Appl. No. 11/461,374, filed Jul. 31, 2006, 11 pages.
Office Communication, dated Jun. 8, 2010, for U.S. Appl. No. 11/461,374, filed Jul. 31, 2006, 14 pages.
Office Communication, dated Jun. 20, 2008, for U.S. Appl. No. 11/461,392, filed Jul. 31, 2006, 17 pages.
Notice of Allowance, dated May 14, 2009, for U.S. Appl. No. 11/461,392, filed Jul. 31, 2006, 7 pages.
Office Communication, dated Sep. 4, 2008, for U.S. Appl. No. 11/461,394, filed Jul. 31, 2006, 13 pages.
Office Communication, dated May 26, 2009, for U.S. Appl. No. 11/461,394, filed Jul. 31, 2006, 15 pages.
Office Communication, dated Aug. 3, 2009, for U.S. Appl. No. 11/461,394, filed Jul. 31, 2006, 2 pages.
Office Communication, dated Feb. 5, 2010, for U.S. Appl. No. 11/461,394, filed Jul. 31, 2006, 12 pages.

Office Communication, dated Jul. 2, 2008, for U.S. Appl. No. 11/461,396, filed Jul. 31, 2006, 26 pages.
Office Communication, dated Feb. 5, 2009, for U.S. Appl. No. 11/461,396, filed Jul. 31, 2006, 10 pages.
Office Communication, dated Jul. 27, 2009, for U.S. Appl. No. 11/461,396, filed Jul. 31, 2006, 25 pages.
Office Communication, dated Oct. 27, 2009, for U.S. Appl. No. 11/461,396, filed Jul. 31, 2006, 2 pages.
Office Communication, dated May 12, 2010, for U.S. Appl. No. 11/461,396, filed Jul. 31, 2006, 27 pages.
Office Communication, dated Mar. 31, 2010, for U.S. Appl. No. 11/561,326, filed Nov. 17, 2006, 10 pages.
Office Communication, dated Dec. 24, 2009, for U.S. Appl. No. 11/674,437, filed Feb. 13, 2007, 7 pages.
Office Communication, dated Jun. 8, 2010, for U.S. Appl. No. 11/674,437, filed Feb. 13, 2007, 15 pages.
Office Communication, dated Sep. 26, 2007, for U.S. Appl. No. 11/675,438, filed Feb. 15, 2007, 9 pages.
Office Communication, dated Mar. 13, 2008, for U.S. Appl. No. 11/675,438, filed Feb. 15, 2007, 14 pages.
Office Communication, dated Sep. 27, 2007, for U.S. Appl. No. 11/675,456, filed Feb. 15, 2007, 9 pages.
Office Communication, dated Mar. 13, 2008, for U.S. Appl. No. 11/675,456, filed Feb. 15, 2007, 11 pages.
Office Communication, dated Jan. 23, 2008, for U.S. Appl. No. 11/675,478, filed Feb. 15, 2007, 8 pages.
Office Communication, dated Aug. 11, 2008, for U.S. Appl. No. 11/675,478, filed Feb. 15, 2007, 9 pages.
Office Communication, dated Nov. 17, 2008, for U.S. Appl. No. 11/675,478, filed Feb. 15, 2007, 3 pages.
Office Communication, dated Mar. 31, 2009, for U.S. Appl. No. 11/675,478, filed Feb. 15, 2007, 9 pages.
Office Communication, dated Oct. 27, 2009, for U.S. Appl. No. 11/675,478, filed Feb. 15, 2007, 9 pages.
Office Communication, dated Apr. 20, 2010, for U.S. Appl. No. 11/675,478, filed Feb. 15, 2007, 9 pages.
Office Communication, dated Jul. 20, 2009, for U.S. Appl. No. 11/698,955, filed Jan. 29, 2007, 6 pages.
Office Communication, dated Nov. 10, 2009, for U.S. Appl. No. 11/698,955, filed Jan. 29, 2007, 17 pages.
Office Communication, dated Mar. 30, 2010, for U.S. Appl. No. 11/698,955, filed Jan. 29, 2007, 12 pages.
Office Communication, dated Jul. 6, 2009, for U.S. Appl. No. 11/768,708, filed Jun. 26, 2007, 14 pages.
Office Communication, dated Jan. 26, 2010, for U.S. Appl. No. 11/768,708, filed Jun. 26, 2007, 14 pages.
Office Communication, dated Oct. 29, 2008, for U.S. Appl. No. 11/770,367, filed Jun. 28, 2007, 6 pages.
Office Communication, dated Jan. 6, 2009, for U.S. Appl. No. 11/770,367, filed Jun. 28, 2007, 21 pages.
Office Communication, dated Jun. 10, 2009, for U.S. Appl. No. 11/770,367, filed Jun. 28, 2007, 21 pages.
Office Communication, dated Oct. 7, 2009, for U.S. Appl. No. 11/770,367, filed Jun. 28, 2007, 2 pages.
Office Communication, dated Dec. 24, 2009, for U.S. Appl. No. 11/770,367, filed Jun. 28, 2007, 25 pages.
Office Communication, dated Jun. 24, 2010, for U.S. Appl. No. 11/770,367, filed Jun. 28, 2007, 25 pages.
Office Communication, dated May 21, 2010, for U.S. Appl. No. 12/558,386, filed Sep. 1, 2009, 15 pages.
Notice of Allowance, dated Nov. 17, 2010, for U.S. Appl. No. 11/381,641, filed May 4, 2006, 7 pages.
Office Communication, dated Nov. 15, 2010, for U.S. Appl. No. 11/561,326, filed Nov. 17, 2006, 7 pages.
Notice of Allowance, dated Dec. 21, 2010, for U.S. Appl. No. 11/674,437, filed Feb. 13, 2007, 8 pages.
Office Communication, dated Jan. 5, 2011, for U.S. Appl. No. 11/770,367, filed Jun. 28, 2007, 27 pages.

* cited by examiner

PAYMENT PROGRAMS FOR HEALTHCARE PLANS

CROSS-REFERENCE TO RELATED APPLICATIONS

This application claims benefit under 35 U.S.C. §120 as a continuation-in-part to U.S. patent application Ser. No. 10/904,639, filed Nov. 19, 2004, now U.S. Pat. No. 7,213, 750, issued May 8, 2007. U.S. patent application No. 10/904, 639 claims the benefit of U.S. Provisional Patent Application No. 60/523,812, filed Nov. 19, 2003, and U.S. Provisional Patent Application No. 60/541,548, filed Feb. 3, 2004. This application also claims benefit under 35 U.S.C. §120 as a continuation-in-part of U.S. patent application Ser. No. 11/275,401, filed Dec. 29, 2005. U.S. patent application No. 11/275,401 claims the benefit of U.S. Provisional Patent Application No. 60/697,514, filed Jul. 8, 2005. The subject matter of the above-referenced applications 10/904,639, 11/275,401 and 60/697,514 is incorporated herein by reference as if fully set forth herein.

BACKGROUND OF THE INVENTION

1. Field of the Invention

The present invention generally relates to a healthcare savings account and payment system and, more particularly, to a system and a method for administering card-based healthcare savings account and provider payment plans.

2. Related Art

Fundamental changes are occurring in the healthcare industry with respect to expenditures by consumers. Healthcare expenditures in the U.S. are expected to increase from approximately $558B in 1988 to approximately $3,361B by 2013. It is projected that consumers will pay a larger share of those expenditures, from approximately 14% in 2001 to an expected 19% in 2010.

Section 125 of the United States Internal Revenue Code offers tax savings to employees for medical, dependent care and childcare expenses. Likewise, Section 132 of the United States Internal Revenue Code offers employees tax savings for work-related parking and transportation expenses. For example, employees may be entitled to tax benefits if the employees withhold a portion of their payroll to pay for medical, dependent care, childcare, work-related parking expenses and/or work-related transportation expenses. In other words, the employees' payroll is taxed on the amount left after the withheld portion is subtracted from the payroll amount and the withheld portion is placed into a flexible spending account.

How consumers pay for healthcare expenditures also is changing. Presently, less than 20% of consumer healthcare payments is through use of "plastic," which includes debit cards, charge cards, and credit cards. This percentage is expected to grow by over 10% in five years to approximately 30% by 2010.

Another fundamental change that is expected to occur in the healthcare industry is the increase in use of consumer-directed healthcare plans ("CDHPs"), which offer tax advantages to employers who offer such plans and, for some CDHPs, to employees as well. Three CDHPs of most interest include: the Flexible Spending Account ("FSA"); the Health Savings Account ("HSA"); and the Healthcare Reimbursement Arrangement ("HRA"). These different CDHPs are discussed in more detail below.

The shift towards CDHPs, while providing tax and other benefits to employers and/or employees, also entails significant administrative costs borne by the employers. These costs include, for example, the costs associated with maintaining individual accounts for each participating employee. Additionally, providers of healthcare goods/services often encounter significant delays in payment from CDHPs, due to the amount of time necessary to substantiate receipts and to determine the respective payment responsibilities of the insurers and the employees.

Given the foregoing, what is needed is a system and a method for administering CDHPs which minimize the administrative costs of employers and which facilitates the process for paying providers.

There is also a need for systems and methods for automatically accessing funds held in a CDHP at the point of sale, and specifically, by utilizing a single payment instrument (e.g., a debit card, credit card, charge card, CDHP card, RFID, etc.) at the point of sale. In addition, there is a need to access multiple CDHPs for different categories of qualifying items utilizing a single payment instrument. Furthermore, there is a need for accessing one or more CDHPs and/or one or more non-CDHPs utilizing a single payment instrument.

BRIEF SUMMARY OF THE INVENTION

The present invention meets the above-identified needs by providing a computer-implemented method and system to facilitate a purchase utilizing a tax-advantaged account, comprising the steps of receiving, from a requester a request for payment for an item; determining whether the item qualifies for pre-tax treatment; and if the item qualifies for pre-tax treatment: determining at least partial payment amount for the item; causing the tax-advantaged account to be debited for at least a portion of the purchasing amount of the item based on the payment authorization, and transmitting the at least partial payment amount for the item to an account of the requestor.

BRIEF DESCRIPTION OF THE DRAWINGS/FIGURES

The features and advantages of the present invention will become more apparent from the description set forth below when taken in conjunction with the drawings in which like reference numbers indicate identical or functionally similar elements.

Figure 5:
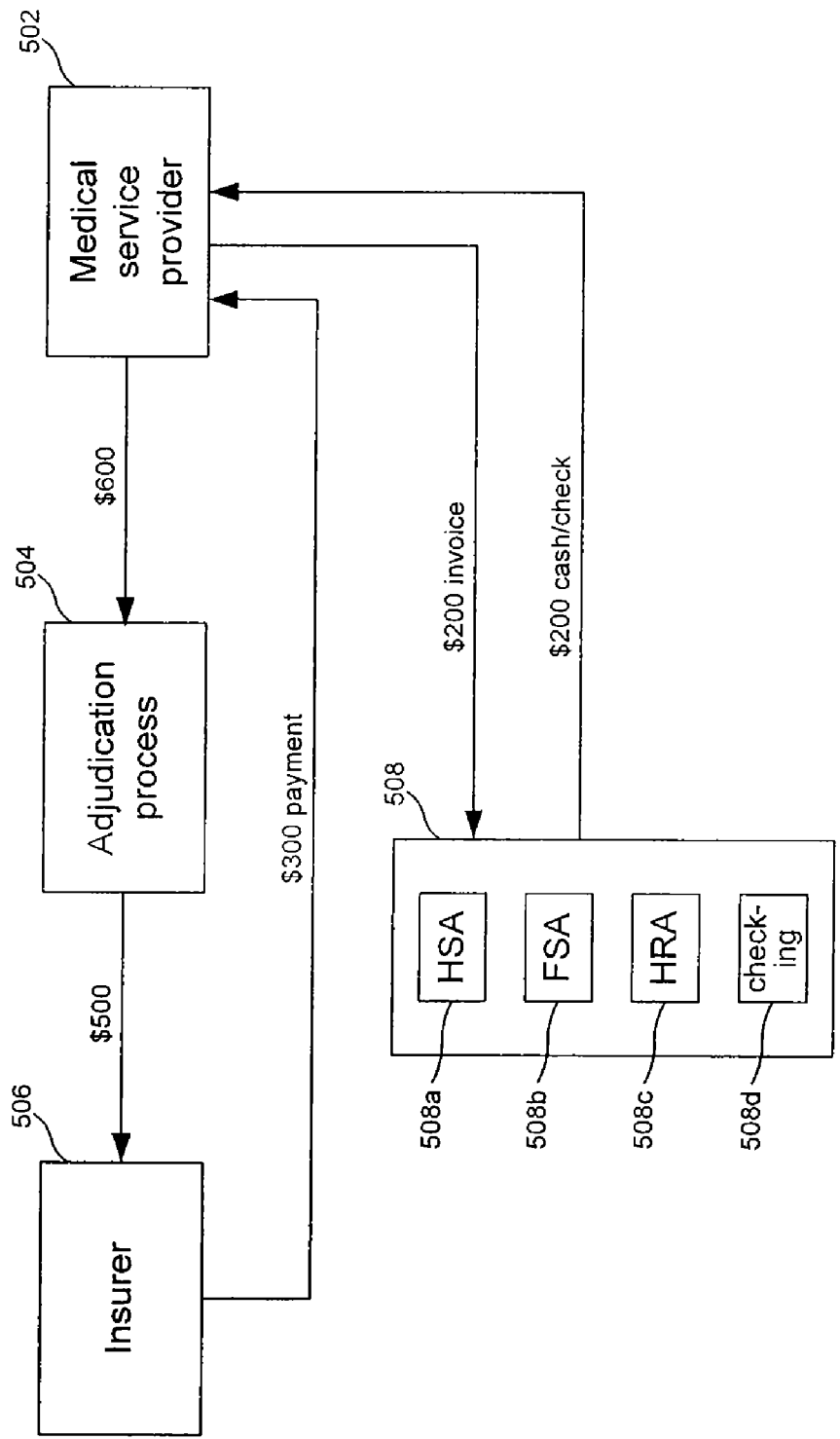
Figure 6:
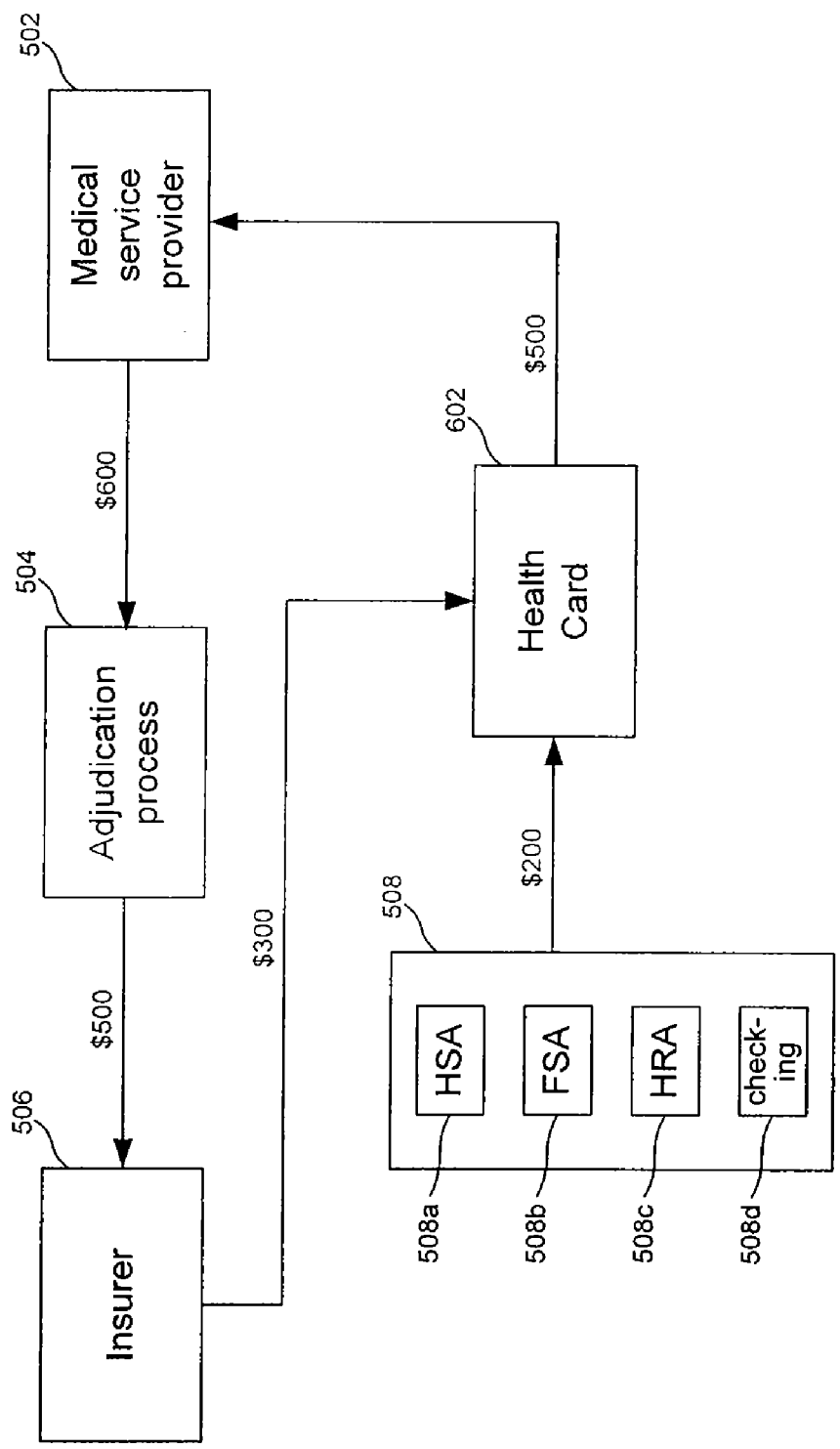
Figure 7:
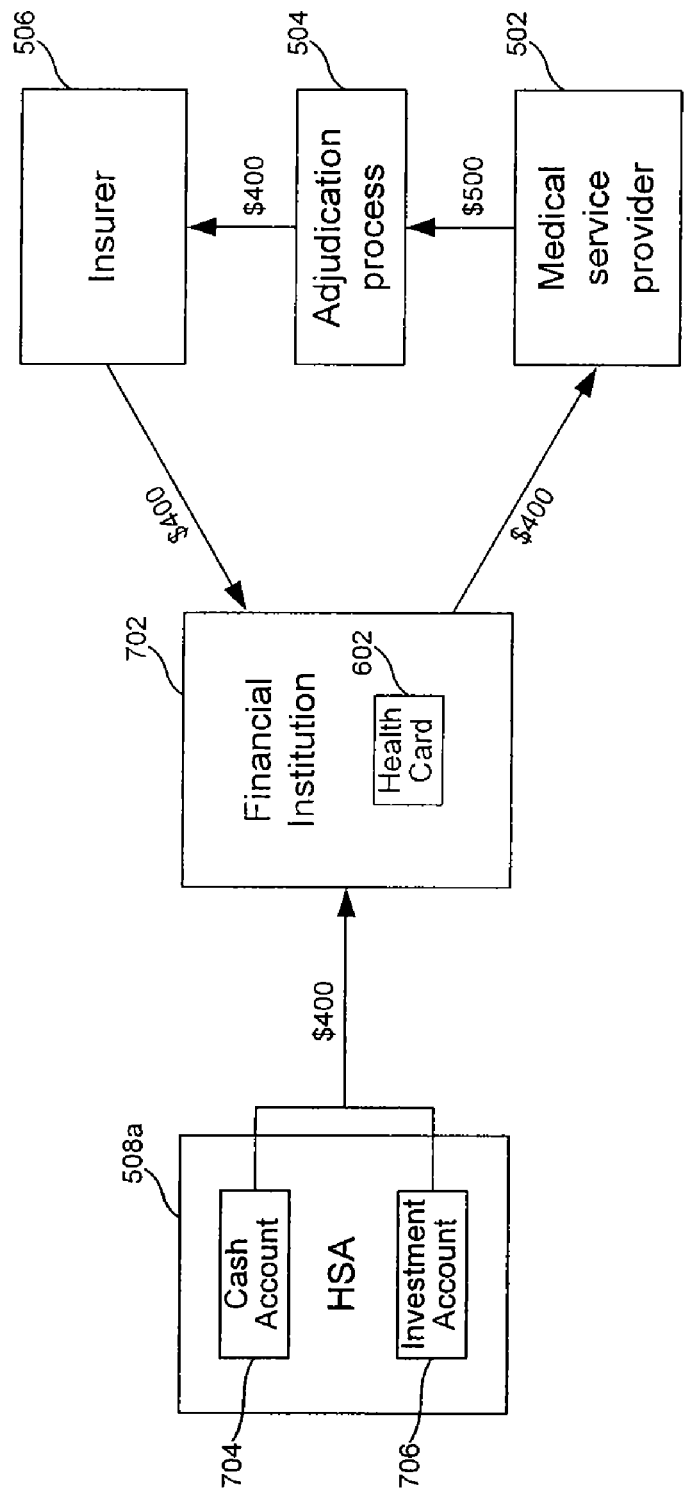
Figure 8:
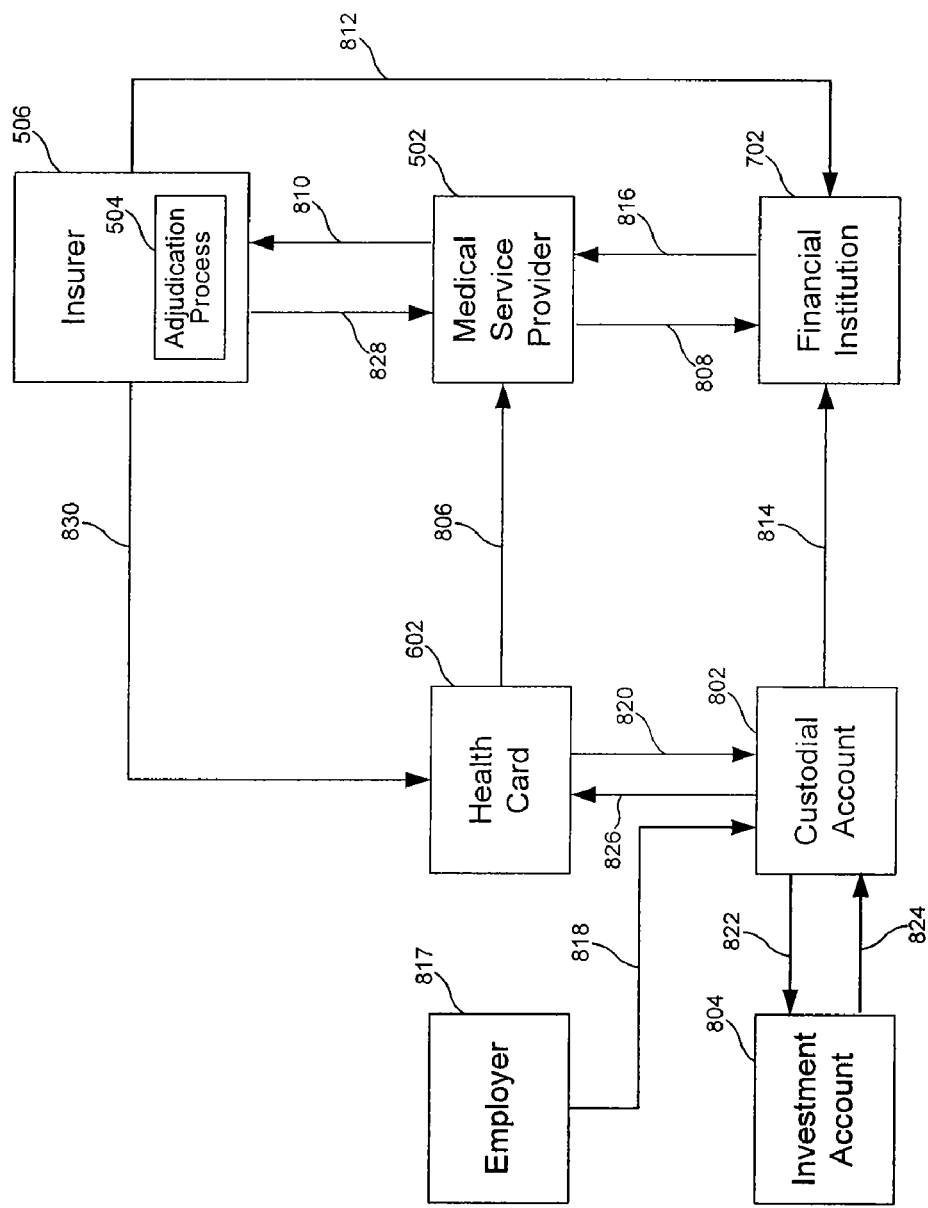
Figure 9:
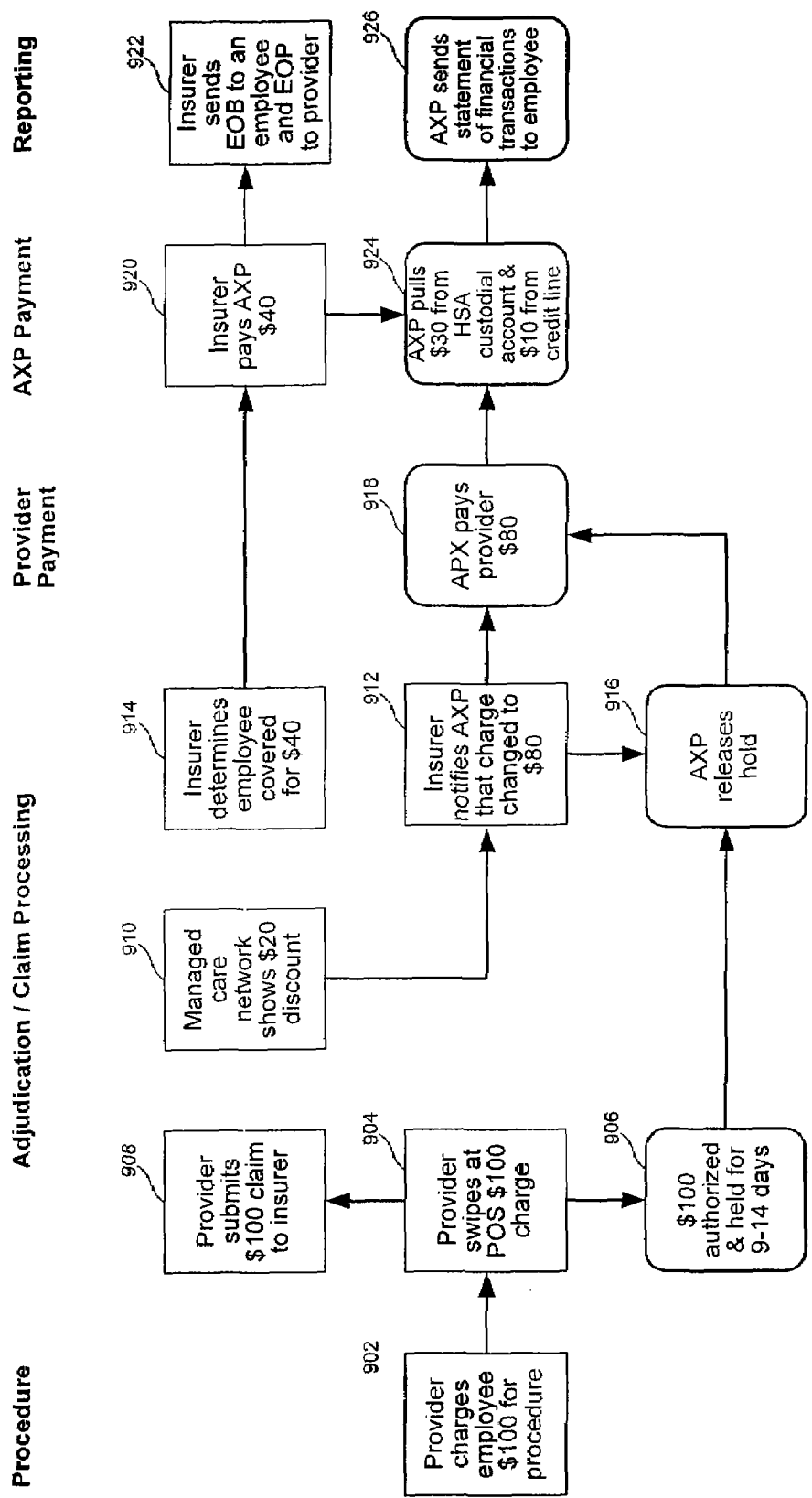
Figure 10:
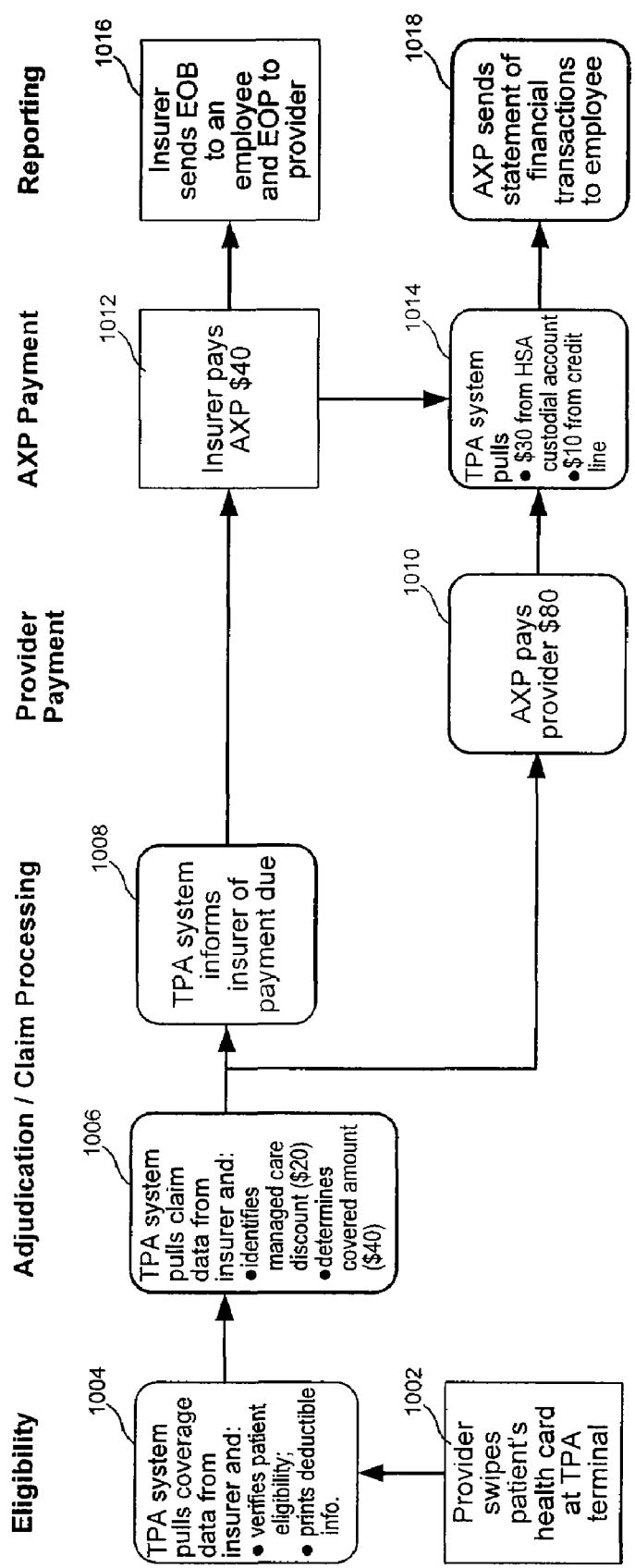
Figure 11:
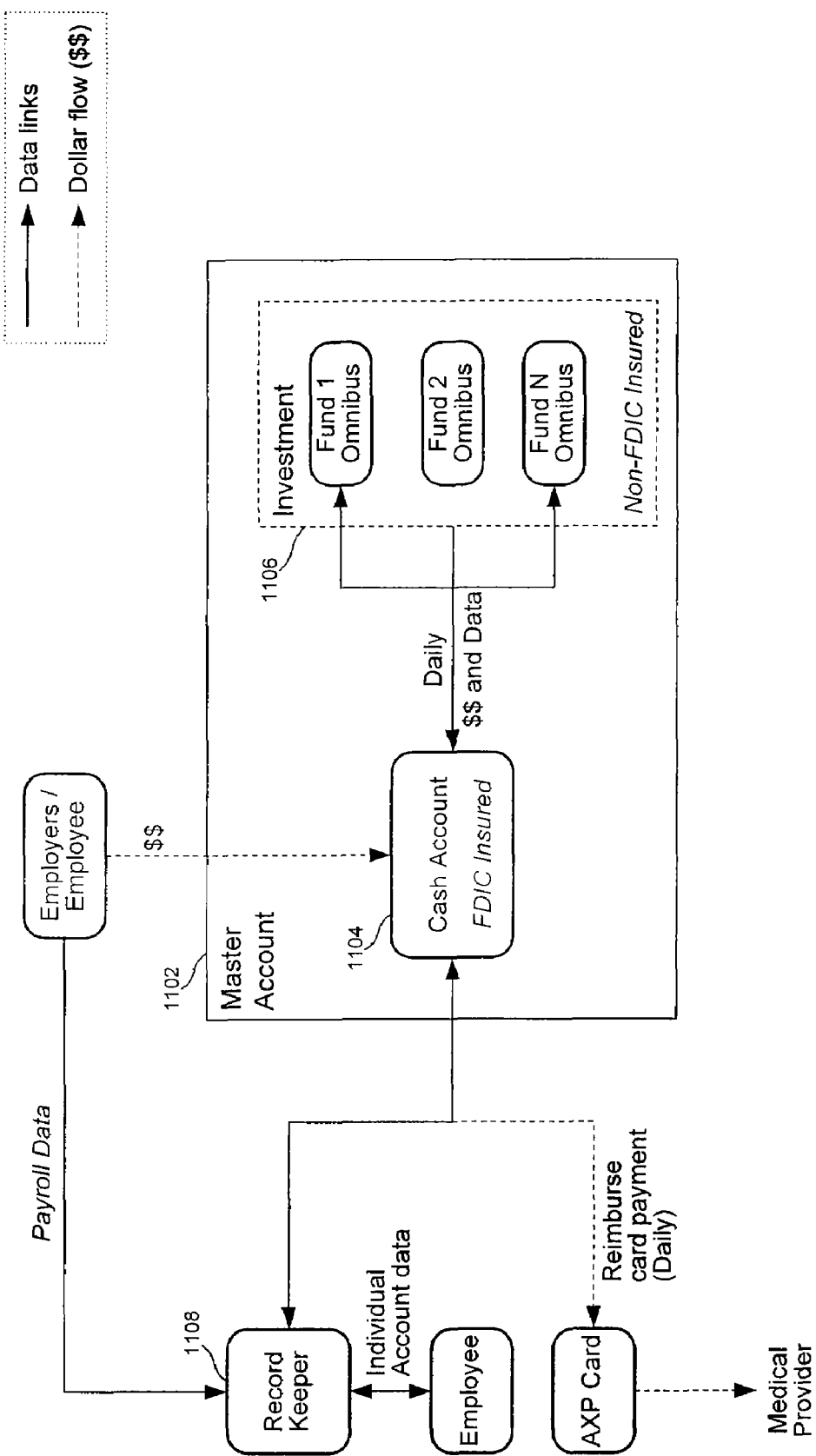
Figure 12:
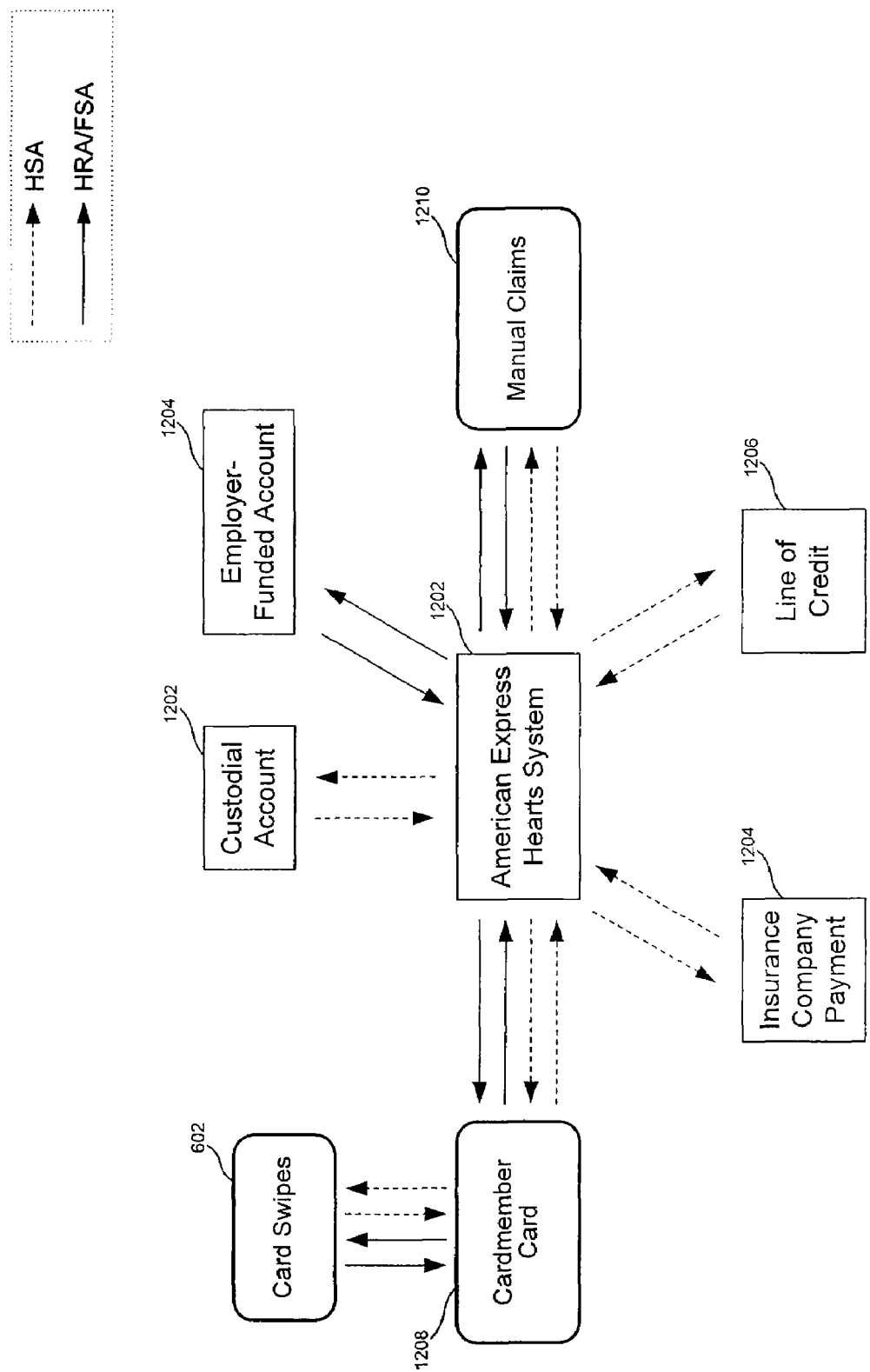

FIG. 5 schematically shows a conventional payment process;

FIG. 6 shows a payment process according to an embodiment of the present invention;

FIG. 7 schematically illustrates an example of a payment process flow according to an embodiment of the present invention;

FIG. 8 schematically illustrates another example of a payment process flow according to an embodiment of the present invention;

FIG. 9 schematically illustrates an example of various steps performed by a provider, an insurer, and a financial institution in connection with a payment process according to an embodiment of the present invention;

FIG. 10 schematically illustrates another example of various steps performed by a provider, an insurer, and a third party administrator in connection with a payment process according to an embodiment of the present invention;

FIG. 11 schematically illustrates an arrangement used by an employer to implement a CDHP according to an embodiment of the present invention;

FIG. 12 schematically illustrates an embodiment of the present invention using a computer system which interconnects the employer, the insurer, financial institution, the employees or a combination thereof.

Figure 13:
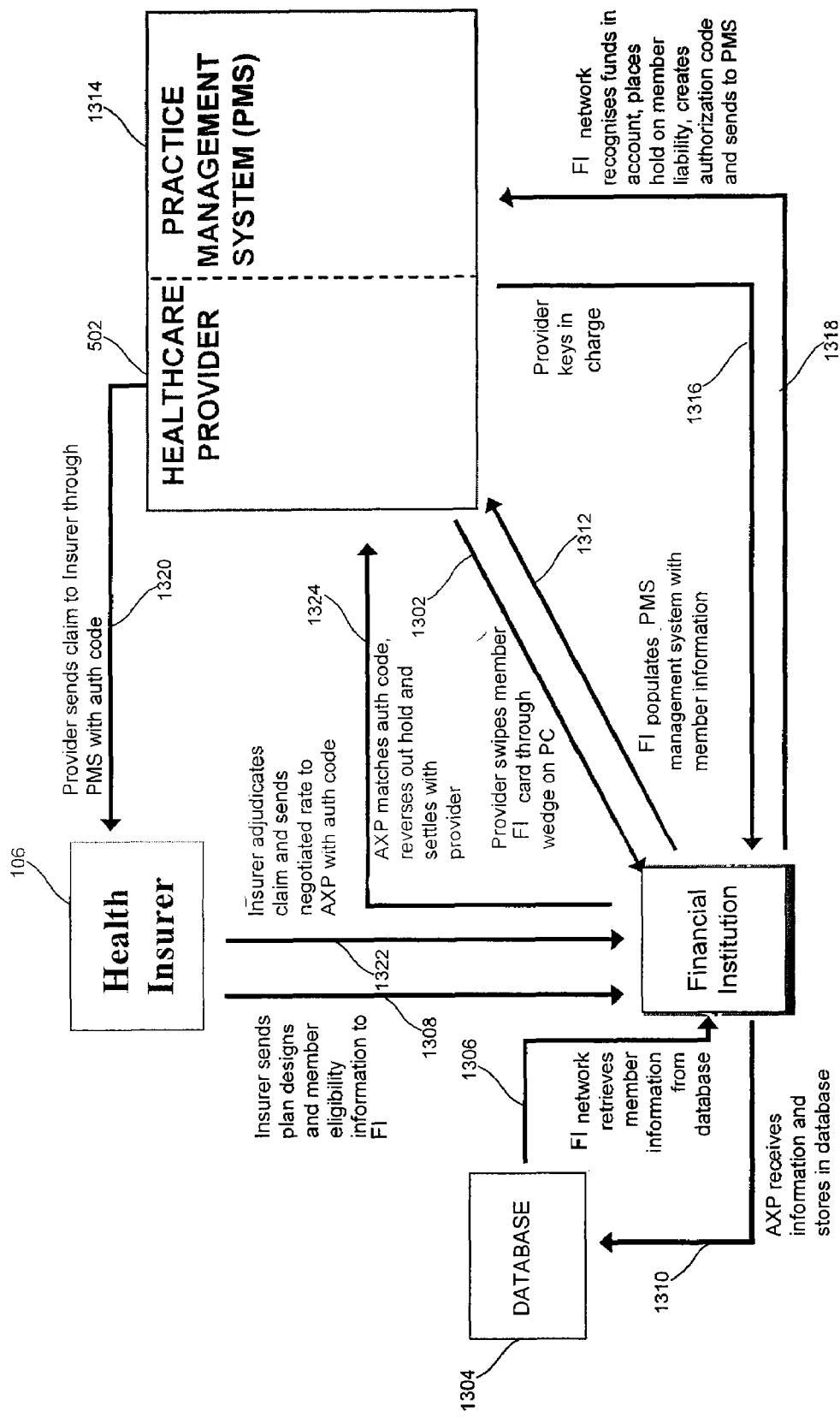
Figure 14:
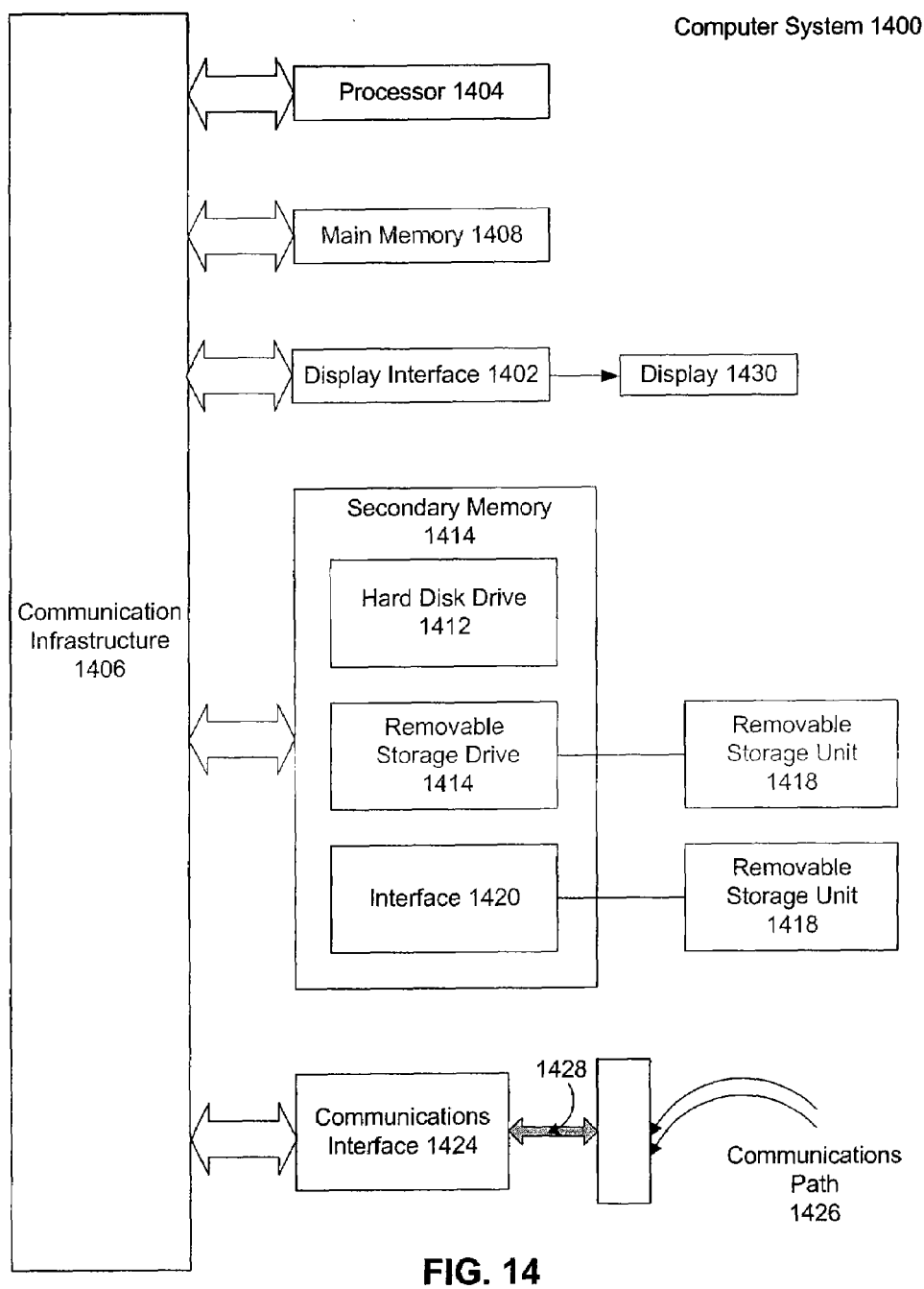

FIG. 13 schematically illustrates an embodiment of the present invention implemented using a closed-loop network (as it relates to healthcare); and FIG. 14 is a block diagram of an exemplary computer system useful for implementing the present invention.

DESCRIPTION OF THE INVENTION

The detailed description of exemplary embodiments of the invention herein makes reference to the accompanying drawings and figures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. It will be apparent to a person skilled in the pertinent art that this invention can also be employed in a variety of other applications. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Terminology

The term "merchant" as used herein shall mean any person, entity, distributor system, software, and/or hardware that is a provider, broker, and/or any other entity in the distribution chain of goods or services. For example, a merchant may be a credit card issuer, a hotel chain, an airline, a grocery store, a retail store, a travel agency, a service provider, including, but not limited to, a medical service provider, an online merchant, or the like.

As used herein, an "item" may be one or more of information, good and/or service capable of being exchanged between entities. In addition, an "item identifier" may include, for example, one or more of a universal product code (UPC), a stockkeeping unit (SKU), a serial number, a reference number, a category number, a service type indicator, a requestor name, a price, a description and/or any other information capable of identifying an item.

An "item qualifying for pre-tax treatment" may include any item that may be purchased with untaxed funds, such as, but not limited to, payroll funds. In one embodiment, an item qualifying for pre-tax treatment is an item included in the Internal Revenue Service Guidelines, which may be changed over time. In addition, an item qualifying for pre-tax treatment may be set and/or changed by any person or entity. Furthermore, an item qualifying for pre-tax treatment may originate at the employer, any third party that may administer a tax-advantaged account, and/or a tax related servicing entity. However, some additional restrictions on coverage may be defined by the employer because the employer may assume the legal risk for some payments. In one embodiment, an information card may be distributed to employees, employers, and/or FSA administrators explaining which expenses and/or items qualify for pre-tax treatment.

A "transaction account" as used herein refers to an account associated with an open account card or a closed account card system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

"Open cards" are financial transaction cards that are generally accepted at different merchants. Examples of open cards include the American Express®, Visa°, MasterCard® and Discover® cards, which may be used at many different retailers and other businesses. In contrast, "closed cards" are financial transaction cards that may be restricted to use with a particular merchant, a particular chain of merchants or a collection of affiliated merchants. One example of a closed card is a card that may only be accepted at a clothing retailer, such as a Saks Fifth Avenue® store.

The term "transaction instrument" as used herein may include any type of open or closed charge card, credit card, debit card, FSA card, stored value card, an RFID chip based card or token, and the like. For convenience, a transaction instrument may be referred to as a "card."

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder, radio frequency card or payment statement).

A "tax-advantaged account" is generally an account that is established and administered under Sections 125 and/or 132 of the Internal Revenue Code. These include, but are not necessarily limited to consumer-directed healthcare plans ("CDHPs"), such as the Flexible Spending Account ("FSA"); the Health Savings Account ("HSA"); and the Healthcare Reimbursement Arrangement ("HRA"). A tax-advantaged account may be referred to herein generally as a flexible spending account (FSA), which should be understood to include other types of tax-advantaged accounts (such as HSA or HRA) unless specifically indicated otherwise.

A FSA is an account set up to hold the withheld portions, and to pay for certain categories of items that qualify for pre-tax treatment under the Internal Revenue Service Guidelines. As it currently stands, if an employee wishes to, for example, establish both a FSA for qualifying childcare expenses and a FSA for qualifying medical expenses, the employee must establish two FSAs and designate how much of the employee payroll to withhold and credit to each FSA. The employee may then withdraw the funds held in each FSA as the employee purchases qualifying items associated with each respective FSA.

Currently, to withdraw funds held in a FSA for qualifying expenses, the employee typically must first purchase the qualifying item, then request the FSA administrator to reimburse the employee for the purchase. More specifically, the employee is usually required to pay for the item at the point of sale, complete and file a claim form along with the sales receipt, wait for the FSA administrator to process and approve the claim, and wait to receive reimbursement. Thus, the current process for withdrawing FSA funds for qualifying expenses is time consuming, requires the employee to be "out of pocket" until reimbursement arrives, and necessitates that the employee perform various tasks after the purchase. Furthermore, in situations where the employee incurs a claim for expenses in different types of FSAs (e.g., a medical expense FSA and a childcare FSA), the employee is generally required to file two claims, one for each respective FSA, following the above steps.

In a typical FSA, which is the most established of the CDHPs, an employer deducts pre-tax dollars from an employee's paycheck to cover IRS-approved healthcare expenses, and the deducted amount is put in the employee's FSA. The employee pays for healthcare goods and/or healthcare services ("goods/services") out of pocket, and submits a receipt for the goods/services for substantiation and reimbursement. A third party administrator ("TPA") reviews the receipt and confirms the purchase of the goods/services. Once confirmed, the TPA sends a reimbursement check to the employee and the TPA is reimbursed by the employer. Funds in the FSA that are not used by the employee by the end of the year are forfeited to the employer. TPAs have begun to offer debit cards to employees for payment of healthcare goods/services. These debit cards enable automation of some aspects of claims substantiation.

An HSA works in conjunction with an insurer's health insurance plan, which incorporates employee-paid deductibles. An employer and/or an employee contributes pre-tax dollars to the employee's HSA to cover IRS-approved healthcare expenses. The contributions are allowed to roll over from year to year and to accumulate tax free indefinitely. Funds in the HSA may be transferred from an investment account to a cash account to pay for expenses. When an HSA card or an HSA check is given to a provider for payment of healthcare goods/services, the provider submits a claim to the insurer. The insurer then determines the employee's share of the payment, withdraws the determined amount from the employee's cash account, and records that amount as part of the employee's deductible.

In a typical HRA, an employer contributes pre-tax dollars to an employee's HRA. Funds in the HRA may be used to pay for deductibles and/or out-of-pocket medical expenses, and may be used to replace existing healthcare benefits. The employer is allowed to determine factors such as: whether substantiation is required; an allowable annual roll-over amount; whether the HRA is to be fully funded at the beginning of the year; and particular goods/services that are not covered. The employee pays for healthcare goods/services out of pocket, and sends in a receipt for the goods/services for reimbursement, which is from funds in the HRA.

As used herein, the terms "employer", "end user", "consumer", "customer", "cardmember", "business" or "merchant" may be used interchangeably with each other, and each shall mean any person, entity, machine, hardware, software or business.

As used herein, "point of sale device" may be any software and/or hardware suitably configured to facilitate a purchase. It may include any means or manner of communicating with one or more host computers for the purpose of making requests for payment or payment authorization. Such means may include, but are not limited to, telephonic means, card readers, computer terminals connected directly to the host computer(s) or indirectly, via e.g., the Internet, or any other means of communication known to persons skilled in the relevant arts.

As used herein, "transmit" may include sending electronic data from one system component to another over a network connection.

Additionally, as used herein, "data" may include encompassing information such as commands, queries, files, data for storage, and the like in digital or any other form.

"Transaction data" may include, for example, one or more of the amount of purchase, at least one payment instrument account number, at least one payment account number, at least one item identifier for each item being purchased, loyalty information, demographic information and/or any other data helpful in processing a transaction.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

Overview

The invention is a computer-implemented method and system to facilitate a purchase utilizing a tax-advantaged account. A request for payment for an item is received from a requester. A determination is made whether the item qualifies for pre-tax treatment. If the item qualifies for pre-tax treatment at least a partial payment amount for the item is determined. The tax-advantaged account is debited for at least a portion of the purchasing amount of the item based on the payment authorization; and the at least partial payment amount for the item is transmitted to an account of the requestor.

Further details of embodiments of this invention are described below.

Embodiments

Figure 1:
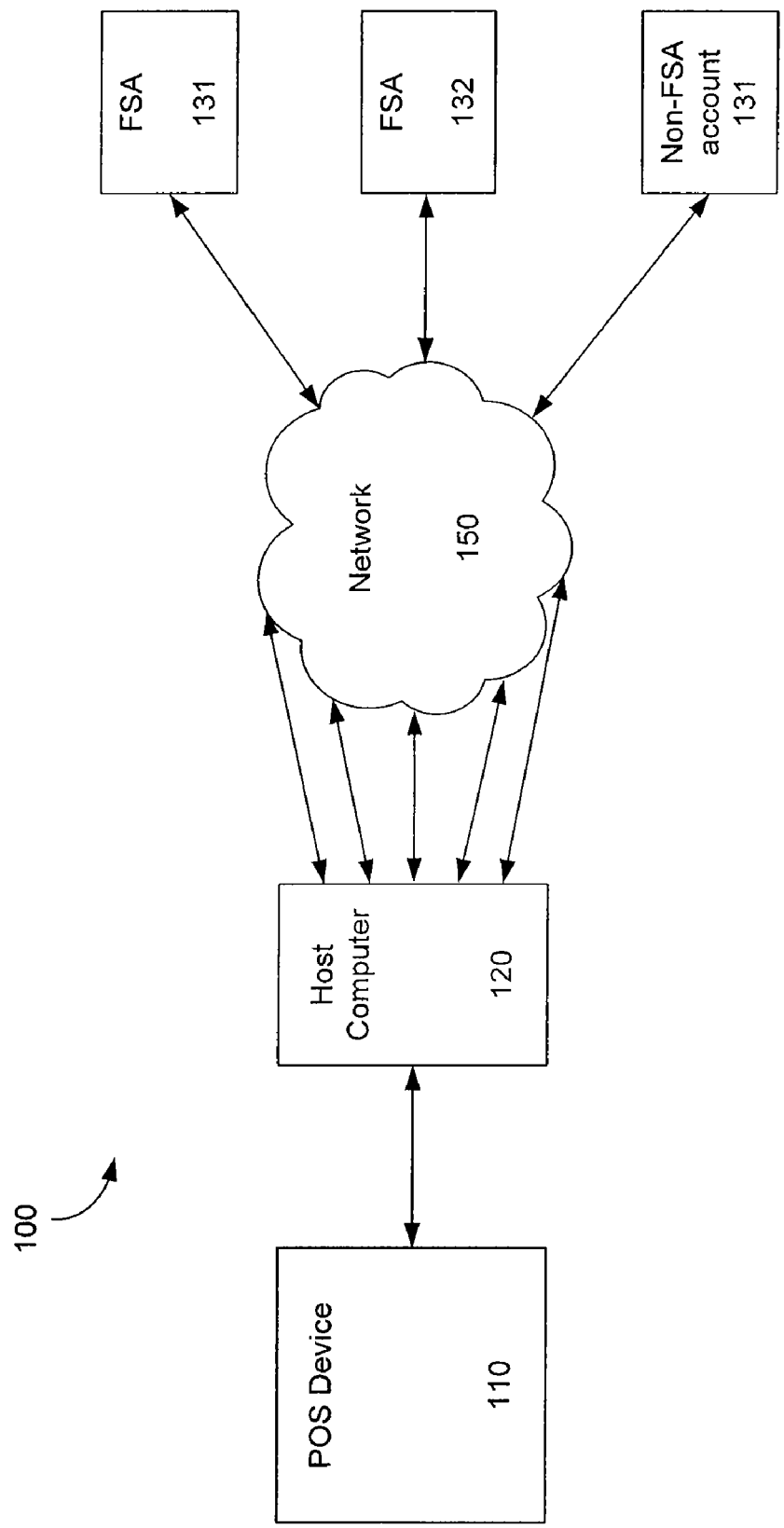
FIG. 1 is a block diagram illustrating an exemplary system configured to facilitate a purchase utilizing a flexible spending account.

FIG. 1 is a block diagram illustrating an exemplary embodiment of a system 100 which utilizes at least one merchant point of sale (POS) device 110 to facilitate the purchase of at least one item utilizing one or more tax-advantaged accounts. In one embodiment, system 100 may facilitate the secure payment and funding services using a pre-funded account (e.g., FSA 131, discussed below) while substantially protecting the privacy of the transaction participants. The comprehensive payment service may be based upon a consolidated account that stores value to be used in on-line and off-line transactions. System 100 may also include processes for authenticating participants, authorizing transactions, and settling payments. As such, embodiments of the present invention may enable merchants to effectively accept non-standard forms of payment at POS device 110 without changing their current payment infrastructures. Embodiments of the present invention may also enable the provision of value for purchases at any network merchant using a variety of sources of value. For further information related to these features, see the patent application entitled CONSOLIDATED PAYMENT ACCOUNT SYSTEM AND METHOD, by inventors: David Armes, et al., filed on Jun. 21, 2002 as Ser. No. 10/176,729, which is hereby incorporated by reference.

In one embodiment, POS device 110 may be configured to receive payment data and/or transaction data. POS device 110 may also be configured to transmit a request for payment authorization, which may include payment data and transaction data, to at least one host computer 120. POS device 110 may be a consumer computing unit in the form of a personal computer, although other types of computing units may be used including laptops, notebooks, hand held computers, set-top boxes, cellular telephones, touch-tone telephones and the like. Moreover, POS device 110 may be a merchant computing unit implemented in the form of a computer-server, although other implementations are contemplated. Moreover, reference to a single POS device, host computer, item or any other component may include one or more POS devices, host computers, items or other components, respectively.

A payment instrument may be associated with, for example, one or more of a flexible spending account (FSA) having an account number, an FSA card, a credit card, a debit card, a charge card, a RFID, a chip based card, a stored value card and/or any other instrument capable of being presented for payment of an item. The payment instrument may be co-branded, include the issuer and employer logo, and/or other trademarks. In addition, the payment instrument may be linked to at least one FSA and/or at least one non-FSA account, both of which are discussed in greater detail below. A payment account may include a transaction instrument-less payment account wherein account information (e.g., account number) may be entered into POS device 110 without using, for example, a card or other physical instrument. In one embodiment, the account may sit on Triumph, and not have any instrument associated with the account. An "account" or "account number", as used herein, may include, for example, any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the present invention may include a fob embodiment, the invention is not to be so limited. Indeed, the system may include any device having a transponder configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include, but are not limited to, watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identifies a particular merchant for purposes of card acceptance, account reconciliation, reporting, or the like.

System 100 may also include a host computer 120. Host computer 120 may be any hardware and/or software suitably configured to communicate and/or process transaction information. In an exemplary embodiment, host computer 120 (or any other computer component discussed herein) may include a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Furthermore, though shown as a main frame computer, host computer 120 may be implemented in other forms, such as a mini-computer, a PC server, a network of computers located in the same of different geographic locations, or the like.

In one exemplary embodiment, host computer 120 may be configured to receive and process a request for payment authorization from POS device 110. An electronic commerce system may be implemented at POS device 110 and host computer 120. In an exemplary implementation, the electronic commerce system is implemented as computer software modules loaded onto POS device 110 and host computer 120. Host computer 120 may not require any additional software to participate in any online commerce transactions supported by an electronic commerce system. Host computer 120 may also be configured to compare an item identifier received from POS device 110 to a list of item identifiers for items qualifying for pre-tax treatment stored within memory of host computer 120. For example, host computer 120 may be configured to compare an SKU and/or a UPC associated with an item to a stored list of SKUs and/or UPCs to determine whether the item qualifies for pre-tax treatment. Furthermore, host computer 120 may include rules and/or algorithms for searching and/or comparing a list of stored item identifiers to an item identifier received from POS device 110. Host computer 120 may additionally be configured to transmit full or partial payment authorization, and/or at least one appropriate decline message to POS device 110.

System 100 may be configured to allow an employer, consumer and/or any other person or entity with certain access rights to FSA 131 to override any decline (e.g., denial of verification) and allow the request for payment to be authorized. In this regard, system 100 may also include an online service accessible via any network (e.g., network 150, discussed below) that allows the employer, consumer and/or third party to check a FSA and charges that were applied against/debited from the FSA, with an opportunity to adjust and/or enter other charges incurred on the payment instrument for this purpose as well (e.g., in case the issuer or acquirer did not recognize a charge properly).

Other features may include, for example, a consumer or a third party to provide approval to charge an account when a billing amount is determined (e.g., after adjudication of the claim); different awards or loyalty features for non-healthcare spending and/or for healthcare spending; preferred member pricing; services multiple players and change of payers (e.g., open enrollment); payer-funded (possibly co-branded) identification features, using the payer's provider portals and other available resources; external integration tools; checking co-pays; checking eligibility status; combine with insurance and/or FSA; rollover allowed or determined by employer; ability to access and draw from multiple FSA and health savings accounts (HSAs); automatic identification of healthcare transactions; roll up accounts into a corporate hierarchy; link flexible spending accounts to existing consumer or corporate accounts; and, routing transactions to different third party accounts.

In one exemplary embodiment, host computer 120 may be configured to debit multiple tax-advantaged accounts according to a predetermined, random or rule based order. Moreover, host computer 120 may be configured to provide a discount to FSA 131, and/or be configured to receive a transaction fee from one or more entities associated with host computer 120. In the set-up of a registration profile, specialized FSAs may be targeted and pre-authorized for specific transaction types and/or items. In addition, post-issue modifications may also be available.

Host computer 120 may also be configured to automatically develop receipts, wherein the receipts may be required for tax purposes and for use related to FSA 131. The receipt may be a confirmed record which lists disputes and other post sale actions. In one embodiment, the receipt may be consolidated and may be configurable. The consolidation may be across multiple FSAs which may be applicable with, for example, corporate accounts or a Small Business Services (SBS). Host computer 110 may issue an end of year statement for the consumer as receipt tracking. In one embodiment, host computer 120 may archive in a database a ROC (receipt of charge) associated with a charge in FSA 131 and, if necessary, help as receipt backup for tax purposes. As such, the additional ROC information along with the statements from host computer 120 provide added value. Host computer 120 may charge the consumer a fee for the archival services or any other services discussed herein. In one embodiment, host computer 120 may supply line item detail statements at the end of the year, wherein the statement discloses each purchase. The service may only be available for certain levels of consumers or certain levels of transaction instruments (e.g., Gold and Platinum cards). Any charges may be paid directly out of FSA 131 using existing or customized stored value systems.

In an exemplary embodiment, host computer 120 may be configured to generate a report detailing transactions occurring within a specified period of time. Reporting may include similar technology and systems as are known in the art for corporate payment instrument reporting. For example, the administrator of host computer 110 may have a reporting relationship at the consumer level and/or corporate level. The consumer level may include monthly statements for each FSA. The statements may be in electronic (e.g. XMS) or paper (e.g., international) form and sent out to the consumer via mail, email, pager or any other communication system or method known in the art. The statements may detail merchant, date, time, and/or amount. In one embodiment, the statements may not include consumer components of the transaction. At the corporate level (e.g., the employer), the system may help corporations manage their expense base with, for example, logistics, reporting tools, etc. A degree of flexibility may exist as to how the corporation desires to manage the accounts. For example, the corporation may settle the account directly and be responsible for reviewing the eligibility of each charge (e.g. for internal employees) or the individual employee may be responsible for settling the account balance and then apply to the corporation for reimbursement of the eligible expenses. Host computer 120 may help the corporation manage their expense base by reporting on the nature of the transactions across their employee base over a certain period of time (e.g. quarterly, annually, etc). The report may include information such as, for example, certain expenses represent x % of their expense base and are split across six suppliers. As such, if they were to establish a preferred supplier arrangement with for example, three pharmaceutical manufacturers, they may reduce their expense base. To maintain privacy, host computer 120 may customize the reporting so as to firewall certain detail from employers (or their outsourced expense review administrators), but still release sufficient information to make it valuable for expense base tracking and management.

Host computer 120 may also be configured to allow the consumer to pay on their personal computer with automatic payment tracking. For example, the consumer may pay online for prescriptions like Express Scripts or at a doctor's office using a payment instrument.

Host computer 120, in an exemplary embodiment, may be configured to communicate with FSA 131 and/or non-FSA account 143, determine an appropriate FSA 131 and/or non-FSA account to debit for each received request for payment, and/or debit FSA 131 and/or non-FSA account 143 for an authorized payment amount. Similarly, any reference to FSA 131 or non-FSA account may also include at least one additional FSA (e.g., FSA 132) or non-FSA account (not shown).

FSA 131 may be any software and/or hardware suitably configured to manage records relating to funds. FSA 131 may be configured to store pretax dollars, and a consumer may establish FSA 131 by specifying a pre-tax amount to be deducted from his/her payroll, and credited to FSA 131. The deducted amount(s) may be held in an employer account, similar to the handling of other deductions, and may be released by the employer for expenditures of items qualifying for pre-tax treatment.

In another embodiment, FSA 131 may be a line of credit account having a line of credit issued to it wherein a consumer may utilize FSA 131 similar to, for example, a charge card or credit card. The line of credit may be issued to FSA 131 by the administrator of FSA 131 or any other entity, such as, for example, a card issuer or other financial institution, capable of extending a line of credit to FSA 131. One skilled in the art will appreciate that a "line of credit account" may include a card account, a demand deposit account, a credit line, a money market account, a digital cash account, and/or any other financial account capable of accepting funds or other value that may be converted to funds. One skilled in the art will also appreciate that the word "value" as used herein refers to funds as well as any goods, services, funds, trade credits and accounts receivable that could reasonably be converted to or measured as funds. As a quantity, value refers to the quantity of funds that could reasonably be derived through conversion of the goods, services, funds, trade credits and accounts receivable to funds.

FSA 131 may also be configured to communicate with host computer 120 and be debited by host computer 120 for items qualifying for pre-tax treatment. In one embodiment, once a transaction including an item qualifying for pre-tax treatment is approved, the funds may be debited through an automated clearinghouse from FSA 131. Most employers have 3-10 days worth of history on hand and a pre-deposit may be collected from the employer. To reduce the number of non-eligible expenses, a service may exist that focuses on real-time authorization. For example, host computer 120 may obtain data and reject it based on a non-match at the point of sale. The "data" may include links to third party information (e.g., Pharmacy Benefit Managers or PBMs) to facilitate processing prescriptions and advising at least one pharmacy about how much to charge for the medication. If the cost matches the billed amount, and the transaction is payable to a pharmacy, then the charge may be validated. Insurance companies may also provide the same type of validation information. Substantiation data may also be LID (line item detail) data associated with a charge. If these checks were to fail, the system may revert to the current process of having the consumer send in receipts to a third party administrator.

Other current offerings may split the approval and authorization (is it a valid expense) into two separate steps. An interim payment processor based system may include systems from, for example, Evolutions Benefits, Medi-Bank and Smart-Flex. These companies offer a product that is used by a third party administrator to review receipts. To handle the entire end-to-end process, system 100 may include an issuing institution on a financial network. System 100 may also provide a FSA and a non-FSA account on the same financial account and/or linked to the same payment instrument.

FSA 131 may be managed and/or linked to funding sources in various ways, such as, for example, U.S. Ser. No. 10/318, 480, filed on Dec. 13, 2002 by Berardi et al. and entitled "SYSTEM AND METHOD FOR ASSIGNING A FUNDING SOURCE FOR A RADIO FREQUENCY IDENTIFICATION DEVICE"; U.S. Ser. No. 10/318,432 filed on Dec. 13, 2002 by Berardi et al. and entitled "SYSTEM AND METHOD FOR SELECTING LOAD OPTIONS FOR USE IN RADIO FREQUENCY IDENTIFICATION IN CONTACT AND CONTACTLESS TRANSACTIONS;" see also U.S. Ser. No. 10/708,585, filed Mar. 12, 2004 by Beenau, et al, entitled "SYSTEMS AND METHODS FOR MANAGING MULTIPLE ACCOUNTS ON A RF PAYMENT INSTRUMENT" and U.S. Ser. No. 10/708,550, filed Mar. 10, 2004, by Beenau, et al, entitled "SYSTEMS AND METHODS FOR PROVIDING A RF TRANSACTION DEVICE OPERABLE TO STORE MULTIPLE DISTINCT ACCOUNTS," all of which are hereby incorporated by reference.

In an exemplary embodiment, FSA 131 may be configured to communicate with host computer 120 via a network 150. Network 150 may include, for example, any electronic communications means which incorporates both hardware and software components of such. Communication among the devices in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference. Moreover, system 100 contemplates the use, sale or distribution of an item or information over any network having similar functionality described herein.

The various system devices (e.g., POS device 110, host computer 120, FSA 131 and non-FSA 143) may be independently, separately or collectively suitably coupled to network 150 via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

System 100, in an exemplary embodiment, may include at least one non-FSA account 143. Non-FSA account 143 may be any software and/or hardware suitably configured to hold funds and/or loyalty rewards, and communicate with host computer 120 via network 150. Non-FSA 143 may include, for example, a credit card account, a checking account, a savings account, a charge card account, a retirement account (e.g., a 401 K, an IRA, etc.), a loyalty rewards account, an HSA and/or any other type of account capable of being credited and/or debited for a purchase.

In one embodiment, non-FSA account 143 may be configured to have host computer 120 debit non-FSA account 143 for an amount of a non-qualifying item and/or partially qualifying amount. Furthermore, non-FSA account 143 may be configured to cause host computer 120 to credit non-FSA account 143 a discount amount similar to FSA 131 discussed above, or credit non-FSA account 143 with loyalty awards (e.g., loyalty points) in an instance when non-FSA 143 is a loyalty account. In this case, non-FSA account 143 may be any type of loyalty account known in the art. Furthermore, non-FSA account 143 may be a HSA configured to allow withdrawal of funds within the HSA to pay for health related-expenses. In one embodiment, a single payment instrument may be linked to both FSA 131 and non-FSA account 143. For example, a consumer may be capable of accessing funds (or line of credit) in a medical FSA and a HSA using a single FSA card. In another embodiment, FSA 131 may be linked to non-FSA account 143. For example, a single payment instrument (e.g., a credit card, charge card, debit card, etc.) may be utilized to pay for multiple items and charged to a single account (e.g., credit card account, charge card account, checking/savings account, etc.). The charges may be separated by category and debited to the appropriate account. For example, each charge may be evaluated at the end of a specified period of time (e.g., monthly) and then pre-tax qualifying charges may be automatically deducted from FSA 131 and the other charges would remain on non-FSA account 143 (e.g., a credit card account).

In a still further embodiment, the single payment instrument may be used to pay for both FSA and non-FSA purchases. In that case, the system 100 may compare an item identifier associated with the item being purchased to a database of item identifiers. If the item being purchased is determined to be tax-advantaged, the FSA will be automatically charged or debited for an appropriate amount; whereas if the item is determined to be non-tax-advantaged, the non-FSA will be automatically charged or debited for the appropriate amount. This operation may take place in real time, as the payment authorization request is being transmitted via the POS device to the host computer 120.

System 100 may also be configured such that each device (e.g., POS device 110, host computer 110, FSA 131 and/or non-FSA account 143) is interconnected via a second network, referred to as a payment network. The payment network, which may be part of certain transactions, represents existing proprietary networks that presently accommodate transactions for credit cards, debit cards, and other types of financial/banking cards. The payment network is a closed network that is assumed to be secure from eavesdroppers. Examplary transaction networks may include the American Express®, VisaNet® and the Veriphone® networks.

Various databases used herein may include, for example, client data; merchant data; financial institution data; and/or like data useful in the operation of system 100. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may also include any suitable personal computer, network computer, workstation, minicomputer, mainframe or the like. A user computer may be in a home or business environment with access to a network. In an exemplary embodiment, access is through a network or the Internet through a commercially available web-browser software package.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing consumer files using an ISO/IEC 7816-4 file structure; implementing a domain whereby a dedicated file is selected that exposes one or more elementary files containing one or more data sets; using data sets stored in consumer files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial payment instrument or external to but affiliated with the financial payment instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial payment instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial payment instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain consumers, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the payment instrument user at the stand alone device, the appropriate option for the action to be taken. The present invention may contemplate a data storage arrangement wherein the header or trailer, or header or trailer history, of the data is stored on the payment instrument in relation to the appropriate data.

One skilled in the art will also appreciate that, for security reasons, any databases, systems, devices, servers or other devices of system 100 may consist of any combination thereof at a single location or at multiple locations, wherein each database or system includes any of various suitable security features, such as firewalls, access codes, encryption, decryption, compression, decompression, and/or the like.

System 100 may be described herein in terms of functional block components and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, system 100 may be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, system 100 may be embodied as a customization of an existing system, an add-on product, upgraded software, a stand-alone system, a distributed system, a method, a data processing system, a device for data processing, and/or a computer program product. Accordingly, system 100 may take the form of an entirely software embodiment, an entirely hardware embodiment, or an embodiment combining aspects of both software and hardware. Furthermore, system 100 may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Figure 2:
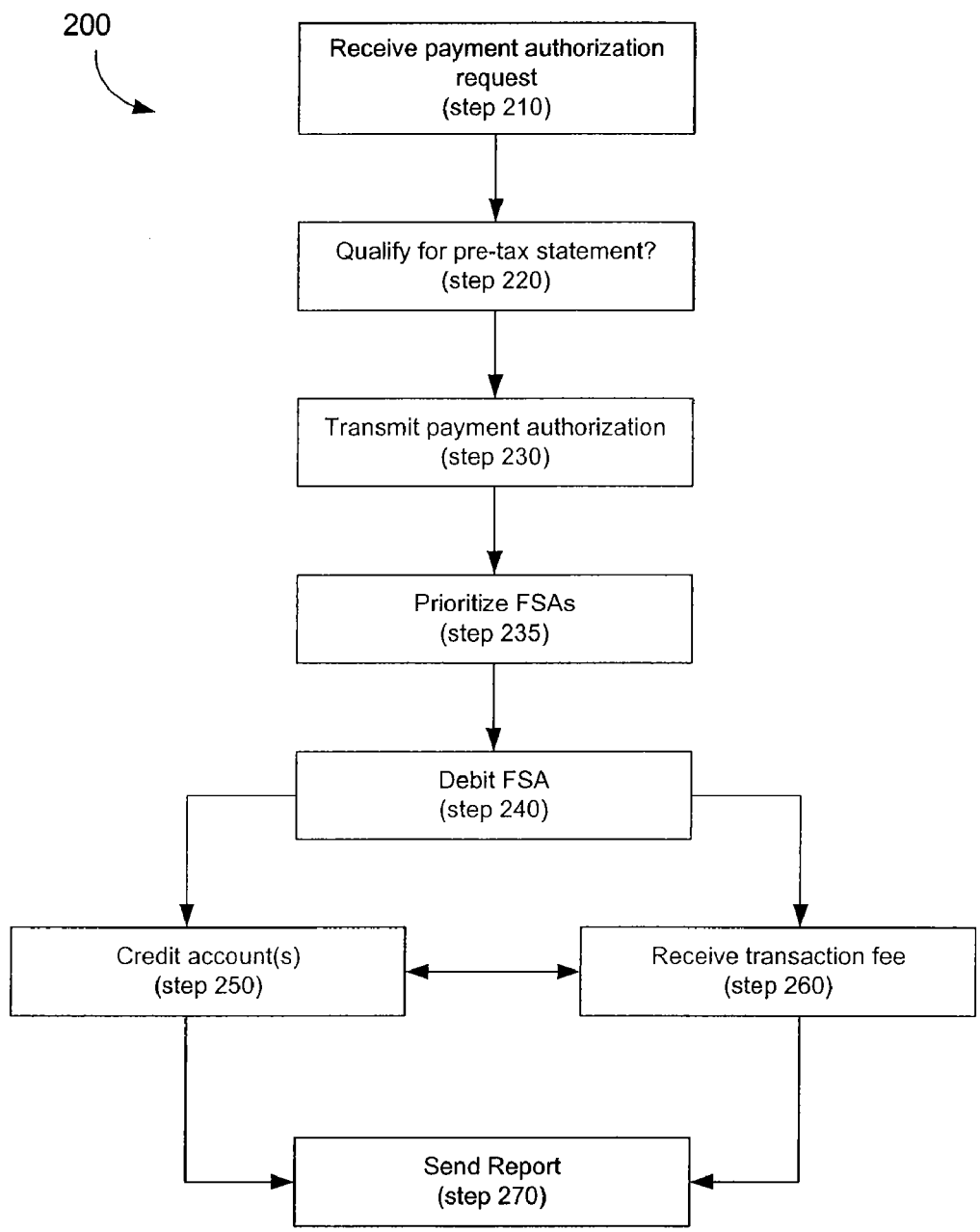
FIG. 2 is a flow diagram illustrating an exemplary method to facilitate a purchase utilizing a flexible spending account.

FIG. 2 is a flow diagram illustrating an exemplary computer-implemented method 200 to facilitate the purchase of an item utilizing a FSA. A host computer (e.g., host computer 120) may receive a request for payment authorization for an item from a POS device (e.g., POS device 110) (step 210). In one embodiment, the request for payment authorization may also include payment data and transaction data. The host computer may process the request for payment authorization to determine if the purchase includes an item qualifying for pre-tax treatment (step 220). In one exemplary embodiment, the host computer may compare an item identifier received from the POS device to a list of item identifiers stored within the host computer to determine if there is a match between an item being purchased and an item qualifying for pre-tax treatment. In other words, to determine if an item being purchased qualifies for pre-tax treatment.

The host computer may transmit full or partial payment authorization to the POS device if there is a match between an item identifier received by the host computer and an item identifier stored in the host computer (step 230). The host computer may transmit full payment authorization if the item being purchased qualifies for pre-tax treatment. In another embodiment, the host computer may transmit only partial payment authorization. Partial payment authorization may occur in situations where an item being purchased does not qualify for pre-tax treatment, and/or where an item being purchased only qualifies for partial pre-tax treatment. In these situations, the host computer may transmit payment authorization only for the amount equal to the proportional cost of an item qualifying for pre-tax treatment, and/or an amount equal to the partially qualifying amount.

Partial payment authorization may also occur where the merchant is part of a service network, such as Blue Cross/Blue Shield, Prudential Healthcare, Kaiser Permanente, etc. In such cases, the merchant typically agrees to accept a fixed amount for a product or service, which is less than the retail amount. Once a payment request is determined to qualify for pre-tax treatment at step 220, the amount of payment authorization is calculated based on the contract between the merchant and the service network. Payment or authorization of the contracted amount is then transmitted in step 230.

Host computer 120 may additionally transmit only partial payment authorization if there are not sufficient funds available in a FSA (e.g., FSAs 131 and/or 132), either individually or collectively, to cover full payment. In this situation, the partial payment authorization may be less than or equal to the FSA credit balance(s), either individually or collectively. In another embodiment, the host computer may transmit full payment authorization, and any deficient amount may be subsequently recovered from the consumer by the administrator of the FSA (if the FSA is debited for the full amount) and/or the administrator of the host computer (if the host computer "covers" the deficient amount).

In an examplary embodiment, non-FSA 143 may be a line of credit issued by the administrator of the host computer, such as a financial institution. If FSA 131 does not contain sufficient funds to cover the full amount of the charge, the host computer may debit non-FSA 143 for the balance of the charge. Alternatively, or additionally, if the merchant charge includes both tax-advantaged items and non-tax-advantaged items, the host computer may debit FSA 131 for the tax-advantaged item charge and debit non-FSA 143 for the item charge that does not qualify for tax-advantaged status.

Host computer 120 may debit a FSA for the full or partial payment authorization amount (step 240). The host computer may debit a single FSA (e.g., FSA 131) for the full payment authorization amount or may debit a first FSA (e.g., FSA 131) for a partial amount and a second FSA (e.g., FSA 132) the remaining amount of the request. In one embodiment, the host computer may debit several FSAs until the host computer has debited the full payment authorization amount. The host computer may determine which FSA to debit based upon the type of item being purchased. For example, the host computer may determine that at least one associated FSA is a medical FSA, and debit the FSA for an amount representing the cost of a qualifying medical item. In addition, in situations where there are multiple items qualifying for pre-tax treatment, the host computer may debit at least one FSA for an amount representing the cost of each qualifying item. In other words, at least one appropriate type of FSA may be debited for each type of qualifying item. For example, host computer 120 may debit at least one medical FSA for an amount representing the cost of each qualifying medical item and at least one dependent care FSA for an amount representing the cost of each qualifying dependent care item included within a single request for payment authorization.

In one exemplary embodiment, the host computer may determine an order in which to debit one or more FSAs (step 235). The order may be established by overall rules about how a FSA is to be used. The order may be based upon the amount of credit within each FSA, such as, use the FSA with the higher/lower amount of credit first. In addition, the order may be based upon at least one date when funds within each respective FSA will expire. For example, an employee may have a FSA from a previous employer (old FSA) and a second FSA maintained by the current employer (current FSA). If the old FSA expires in June, while the current FSA does not expire until December, the two may be linked to a single payment instrument, with rules set up to draw from the old FSA first, and the more current FSA second. The debit amount may be subject to (or re-calculated based upon) any deductibles, prepayments, discounts, coupons, etc.

Host computer 120, in an exemplary embodiment, may credit an amount to a FSA to reflect a discount given to the consumer and/or credit a loyalty account of the customer (step 250). In one embodiment, the discount and/or loyalty credit may be given to the consumer for presenting a particular payment instrument (e.g., an American Express® charge card) as payment for the purchase, for purchasing a particular item, for making a purchase greater than a pre-determined amount, for accumulating purchase amounts greater than a pre-determined amount, and/or for any other reason for providing a discount to a consumer. The discount and/or loyalty credit may be given to the consumer from the payment instrument issuer, manufacturer of the item being purchased, the merchant selling the item, the administrator of the FSA, the government, and/or any other entity that may provide a discount and/or loyalty credit to a consumer.

In another exemplary embodiment, the host computer may receive a transaction fee for each transmitted payment authorization (step 260). The transaction fee may be a set amount, a changing amount, random amount, percentage of the purchase amount and/or the like. In one embodiment, the transaction fee may be received from the merchant requesting payment authorization, the FSA, the FSA administrator, the consumer, and/or any other entity appropriate to charge a transaction fee.

In yet another exemplary embodiment, the host computer may send a report to the consumer, merchant, a government agency and/or administrator of the FSA detailing each transaction (step 270). The report may be sent daily, weekly, monthly, quarterly, semi-annually, annually and/or any other specified period of time.

Figure 3:
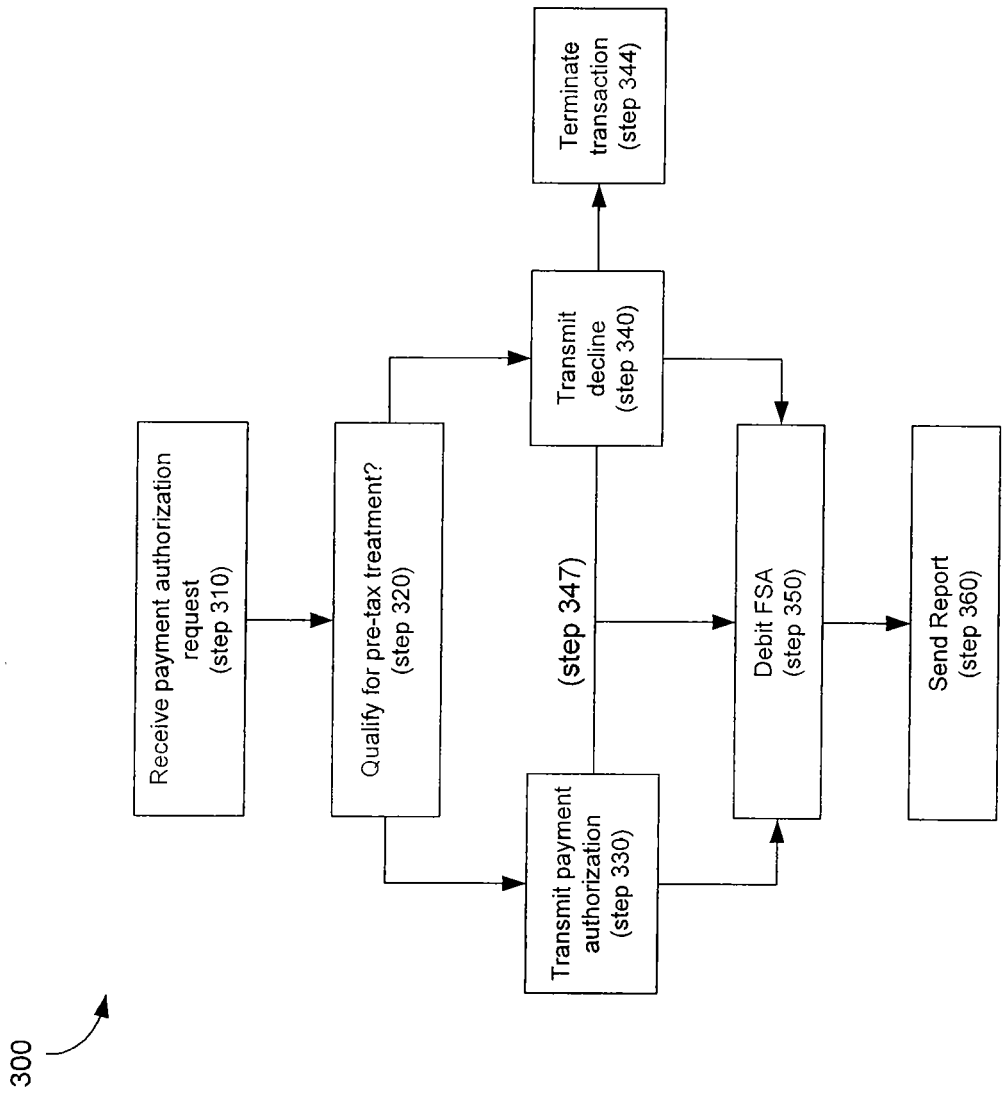
FIG. 3 is a flow diagram illustrating another exemplary method to facilitate a purchase utilizing a flexible spending account.

FIG. 3 is a flow diagram illustrating another exemplary computer-implemented method 300 to facilitate a purchase utilizing a FSA. Host computer 120 may receive a request for payment authorization from a POS device (e.g., POS device 110) similar to step 210 discussed above (step 310). In addition, host computer 120 may determine if an item qualifies for pre-tax treatment similar to step 220 discussed above (step 320). Host computer 120 may also transmit full or partial payment authorization to the POS device similar to step 230 discussed above (step 330).

If the request for payment authorization includes an item that does not qualify for pre-tax treatment and/or an item that only qualifies for partial pre-tax treatment, in one exemplary embodiment, host computer 120 may transmit a "decline" message to the POS device (step 340). The decline message may decline only the amount of the item that does not qualify for pre-tax treatment and/or the non-qualifying partial amount. Moreover, the decline message may decline the entire amount of the payment authorization and terminate the request for payment authorization (step 344). In one embodiment, partial payment authorization may be transmitted by the host computer in accordance with step 330 along with a decline message in accordance with step 340 (step 347). The system may request that the customer pay for all or a portion of the item with another account; then the system may authorize the reduced amount.

In one embodiment, method 300 may also include the host computer debiting at least one FSA for the authorized amount (whether it be full or partial) similar to step 240 discussed above (step 350). In addition, the host computer may also send a report similar to step 270 discussed above (step 360).

Figure 4:
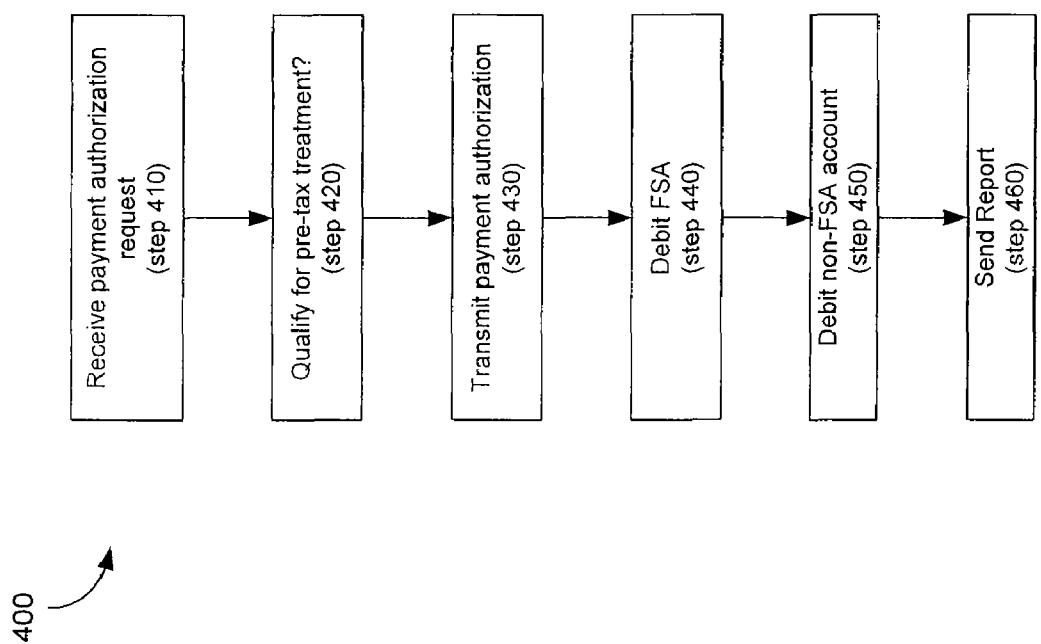
FIG. 4 is a flow diagram illustrating an exemplary method to facilitate a purchase utilizing a flexible spending account and a non-FSA account.

FIG. 4 is a flow diagram illustrating an exemplary computer-implemented method 400 to facilitate a purchase utilizing a FSA and a non-FSA account. Host computer 120 receives a request for payment authorization from a POS device (e.g., POS device 110) similar to steps 210 and 310 discussed above (step 410). Furthermore, the host computer may determine if an item qualifies for pre-tax treatment similar to steps 220 and 320 discussed above (step 420). Moreover, host computer 120 may transmit full or partial payment authorization to the POS device similar to steps 230 and 330 discussed above (step 430), and debit a FSA similar to steps 240 and 350 discussed above (step 440).

In one exemplary embodiment, method 400 may include the host computer debiting a non-FSA account (e.g. non-FSA account 143) for an item not qualifying for pre-tax treatment or for an item that may only qualify for partial pre-tax treatment (step 450). For example, the host computer may debit a non-FSA account for vitamins since vitamins may not qualify for pre-tax treatment. The host computer may also debit a non-FSA account (for vitamins) and, for example, a medical FSA for cough syrup included in a single request for payment authorization. Method 400 may also include the host computer sending a report similar to step 270 discussed above (step 360). Thus, method 400 contemplates debiting at least one FSA account for one or more items qualifying for pre-tax treatment and debiting at least one non-FSA account for one or more items not qualifying for pre-tax treatment that may be included in a single request for payment authorization. Typically, but not necessarily, the non-FSA account(s) is a line of credit account maintained by the financial institution for the employee/cardmember.

FIG. 5 schematically shows a conventional payment process, which is compared with a payment process according to an embodiment of the present invention, as shown in FIG. 6. Although the following description refers to the use of an HSA, the present invention may be practiced with an FSA or an HRA or any combination of the three types of CDHP accounts.

As shown in FIG. 5, in the conventional process, a provider (e.g., a doctor) 502 submits a claim for adjudication. For example, the claim may be for services rendered for an employee in the amount of $600. The adjudication process 504 makes a determination of the amount that the services are worth. In the current example, the claim for $600 is adjudicated to be worth $500. The employee's insurer 506 is notified of the adjudicated amount and, in turn, the insurer pays its share of the responsibility for the adjudicated amount to provider 502. For example, if the employee has an unpaid $200 deductible or if the insurer is responsible for 60% of the adjudicated amount, then the insurer pays the amount of $300 to the provider. Provider 502 then sends the employee an invoice for the unpaid portion of the adjudicated amount. The employee then pays the provider using funds from his/her account 508, typically comprising one or more of an HSA 508*a*, an FSA 508*b*, an HRA 508*c*, or a private account 508*d*.

FIG. 6 illustrates an aspect of the present invention in which the process of paying the provider is streamlined by use of a health card 602. Health card 602 is administered by a financial institution, which coordinates contributions from the insurer 506 and the employee's account 508. Although the described embodiments refer to health cards and medical service providers, it will be clear to those persons skilled in the relevant arts that various aspects of the methods and systems disclosed here are equally applicable to other types of transaction instruments and merchants.

FIG. 7 schematically illustrates an example of a payment process flow according to an embodiment of the present invention. In the illustrated example, an employee visits medical service provider 502 for a $500 procedure. The employee uses health card 602 to pay for the procedure. Health card 602 is administered by a financial institution 702 (e.g., American Express Co., Inc., of New York, N.Y. or "AXP"). Provider 502 files a claim for the service. Adjudication process 504 determines the value of the service to be $400. Insurer 506 identified by health card 602 is notified and sends financial institution 702 information on the claim and the adjudicated rate. Financial institution 702 obtains funds to pay for the adjudicated rate from insurer 506 and/or from the employee's HSA 508*a*. Preferably, HSA 508*a* includes a cash account 704 as well as an investment account 706. In the example of FIG. 7, the employee is responsible for the entire adjudicated rate of $400. However, if each of the insurer and the employee are responsible for a portion of the adjudicated rate, the financial institution would obtain funds from each responsible party in amounts corresponding to their respective portions. Financial institution 702 then sends the obtained funds to provider 502.

FIG. 8 schematically illustrates another example of a payment process flow according to an embodiment of the present invention. In the illustrated example, an employee visits provider 502 and uses health card 602 to pay for services rendered at step 806. Health card 602 is administered by financial institution 702. Provider 502 swipes health card 602, which initiates a communication to financial institution 702 at step 808 to perform an authorization process and to withhold payment until authorization is granted. Provider 502 also files a claim at step 810 with insurer 506 identified by health card 602, and insurer 506 adjudicates the claim to be worth an adjudicated amount. Insurer 506 then transfers its share of the adjudicated amount at step 812 to financial institution 702, along with other information regarding the claim and/or the employee, such as the claimed amount, the adjudicated amount, the employee's remaining deductible amount, etc. Financial institution 702 obtains funds to pay for the employee's share of the adjudicated amount by accessing at step 814 a custodial account 802 set up for the employee. Financial institution 702 settles the claim of provider 502 at step 816 using funds from insurer 506 and funds from the employee's custodial account 802.

Custodial account 802 is a CDHP account and is a cash account that is funded by employer 817 contributions at step 818 and/or contributions from the employee at step 820. In accordance with applicable laws and regulations, the employee contributions may be made via pre-tax payroll deductions. Any unused funds in the custodial account may be rolled over or transferred at step 822 into an investment account 804. When funds are necessary for payment of an adjudicated amount, funds may be transferred back into custodial account 802 at step 824 from investment account 804. Custodial account 802 is administered by a custodian, which may or may not be associated with financial institution 702. In one embodiment, investment account 804 is administered by financial institution 702. The custodian periodically provides the employee with a statement of financial transactions at step 826 involving custodial account 802. Optionally, insurer 506 may send reports at step 828 to provider 502 explaining payments for claims, and may send reports at step 830 to employees explaining bills to their CDHP accounts.

According to an aspect of the present invention, provider 502 sends a claim for the retail charge to insurer 506 for adjudication processing. Insurer 506 processes the claim and sends a file to financial institution 702.

A settlement is generated by matching the retail charge with a hold placed on the cardmember's account in the amount of the retail charge, including an initial authorization number for the transaction (when available). Optionally, financial institution 702 may use the following fields as additional sources of verification for the transaction: cardmember/employee name and ID number, date of the claim, location (e.g., zip code of the provider's office), and Tax ID number of the provider.

On matching the claim, financial institution 702 reverses the original authorization and settles with provider 502 for the discounted (adjudicated) claim amount or the retail charge subject to other adjustments, if warranted.

In another embodiment, provider 502 sends a claim to insurer 506 for adjudication processing. Insurer processes the claim and sends a file to financial institution 702. Upon receipt of the file, which includes the adjudicated amount of payment, financial institution 702 deposits the payment into an account of provider 502 rather than sending a check to provider 502. In this way, provider 502 receives payment promptly. In a variation of this embodiment, provider 502 sends the claim directly to financial institution 702. Financial institution 702 compares the provider's merchant identifier with a database of qualified merchant identifiers. If the provider's identifier matches an identifier in the database, financial institution 702 immediately debits the employee's tax-advantaged (e.g. FSA) account and transfers the payment, less any applicable service fees and/or other adjustments, directly into the provider's account. This results in faster payment to the provider.

In various embodiments, provider 502 may be a medical service provider, such as a doctor or a hospital, or it may be a retail merchant, such as a pharmacy. Alternatively, provider 502 may submit its charge through an intermediary, such as a third party administrator ("TPA"). The TPA will be the party requesting payment from the FSA.

Provider 502 receives an explanation of payment ("EOP") from insurer 506 that includes the discounted claim amount, the retail charge, and claim number. The cardmember/employee receives an explanation of benefits ("EOB") from insurer 506 including the retail claim amount, the discounted amount paid to provider 502, and the claim number. The provider's statement and the member's statement both will include the claim numbers referenced above and reflect the discounted amount paid.

FIG. 9 schematically illustrates an example of the steps performed by provider 502, insurer 506, and financial institution 702 (referred to as "AXP" in FIG. 9) in connection with a payment process. In this example, provider 502 has performed a service or procedure for the employee, and the cost of the procedure is $100. Because provider 502 is a member of a network of providers associated with the insurer, there is a 20% discount on the cost of the procedure. The employee is covered by insurer 506 for 50% of the cost of the procedure, and the employee has $30 in her HSA 508*a*.

As shown in FIG. 9, in one exemplary embodiment, provider 502 charges the employee $100 for the procedure at step 902, which the employee pays using her health card 602. Provider 502 swipes health card 602 at step 904 using a point-of-sale ("POS") device, such as those commonly used by merchants for registering payments made with credit/debit cards, and the provider enters the charge of $100 on the POS device. A code on the health card is automatically read, either electrically, magnetically, optically, or a combination thereof. Optionally, as is well known in the art, if the code cannot be automatically read by the POS device, a numeric code on health card 602 can be manually entered on the POS device by provider 502. The charge of $100 undergoes authorization processing and financial institution 702 holds payment for a period of time (e.g., five to fourteen days) at step 906. Provider 502 also submits a claim for $100 to insurer 506 at step 908.

At step 910, insurer 506 determines that provider 502 is "in-network" and therefore the claim is entitled to a 20% discount, i.e., the adjudicated amount to be paid to the provider is $80. At step 912, insurer 506 notifies financial institution 702 of the adjudicated amount and also determines that the employee is responsible for 50% of the adjudicated amount, or $40, at step 914. Financial institution 702 releases the hold on the payment at step 916 and pays provider 502 $80 at step 918. Insurer 506 pays financial institution 702 for its share of the adjudicated amount (i.e., $40) at step 920, and sends a report at step 922 to provider 502 explaining the payment of the adjudicated amount. Insurer 506 also sends a report at step 922 to the employee explaining her share of the adjudicated amount, which is to be billed to her HSA 508*a*.

The employee's HSA 508a has $30 in cash, so financial institution 702 accesses HSA 508a at step 924 to obtain the $30 and also obtains the remaining $10 from a credit line associated with the employee. Financial institution 702 sends a report to the employee at step 926 explaining the financial transactions that occurred.

Optionally, some of the steps performed by the insurer and the financial institution may be performed by an external third party administrator, referred to as a TPA, as shown in FIG. 10. At step 1002, provider 502 swipes the employee's health card 602 on a TPA POS terminal, in a similar manner as described above. At step 1004, the TPA system verifies the employee's eligibility and determines deductible information. At step 1006, the TPA system pulls claim data from insurer 506, identifies the managed care discount and determines the covered amount. At step 1008, the TPA system notifies insurer 506 of the amount of payment. At the same time, at step 1010, the TPA notifies financial institution 702 to pay provider 502 $80. At step 1012, insurer 506 pays financial institution 702 the covered amount ($40). At step 1014, the TPA system withdraws $30 from the employee's HSA 508a and $10 from the employee's credit line. At step 1016, insurer 506 sends a report to provider 502 explaining the payment of the adjudicated amount and to the employee explaining her share of the adjudicated amount. At step 1018, financial institution 702 sends a statement of the financial transactions to the employee.

One of the advantages of associating an investment account with a CDHP account is that such an association provides the employee with flexibility in how funds designated for healthcare are managed. That is, the employee has control over whether the funds are maintained as cash or are invested in stocks, bonds, and/or other types of securities, which have the potential to grow in value.

FIG. 11 schematically illustrates an arrangement used by an employer to implement a CDHP according to an embodiment of the present invention. As shown in FIG. 11, the employer maintains a Master Account 1102 in which all the funds for the employees are aggregately held. The Master Account includes a cash account 1104, which is FDIC insured, and an investment account 1106, which is not FDIC insured. The investment account allows for investment in a plurality of investment funds. Money and data are transferred between the cash account and the plurality of investment funds of the investment account on a periodic basis (e.g., hourly, daily, or weekly, etc.).

Funds in Master Account 1102 are automatically obtained from the employees through payroll deduction and/or from the employer. A record keeper 1108 maintains a record of each employee's individual CDHP account, including the allocation of the employee's funds to cash account 1104 and investment account 1106, as well as the allocation of the employee's investment-account funds to the plurality of investment funds.

The present invention may be implemented using a computer system, which interconnects the employer, the insurer 506, financial institution 702, the employees or a combination thereof, as schematically shown in FIG. 12. The illustrated "Hearts System" 1202 is a centralized computer-based system that allows financial institution 702 to manage custodial accounts 802, employer-funded accounts 1204, manual claims 1410, lines of credit 1206, payments 1204 from insurers 506, "card swipes" (i.e., requests for payments from providers) 1208, etc. That is, financial institution 702 facilitates the transfer of funds between multiple sources.

Hearts System 1202 allows for the reconciliation of transactions from multiple funding sources with the use of a single health card 602. System 1202 obtains funds from an appropriate funding source based on a hierarchy and a merchant/provider category code associated with each card. The various funding sources include any or all of an HSA 508a, an FSA 508b, an HRA 508c, a line of credit 1406, and a transit account 508d. The merchant/provider category code determines how an expense is allocated based on the merchant type. This allows for specific funding buckets to be used for dental goods/services, and different specific funding buckets to be used for vision goods/services, for example. According to an aspect of the present invention, these funding sources may be established as special purpose HRAs, FSAs, or benefits paid under "Section 132" for transportation benefits. In this instance the employer would fund an account for such transactions and the financial institution would allocate money for the transactions as they occur by pulling funds via an Automated Clearing House (ACH) arrangement.

Financial institution 702 pulls funds from the employee's CDHP account for transactions that should be debited from the CDHP account. Account numbers for the employees are stored in Hearts System 1202 to allow information to be passed to ACH funds.

Another funding source that is accessible by Hearts System 1202 is an employee's line of credit 1206 which may be underwritten by financial institution 702. According to the multiple-source funding arrangement of the present invention, financial institution 702 allows an employee ("cardmember") to opt to have his line of credit tapped first as a funding source before tapping the CDHP account, for those cardmembers who wish to maximize the tax benefits of the CDHP account as a savings vehicle.

Manual claims that are funded from the employer or individual accounts are sent to financial institution 702 prior to approval by insurer 506 or a TPA. This allows the financial institution to adjust the balance in the appropriate funding source, thus preventing accounts from becoming overdrawn.

To assure payment of providers, when insurer 506 and financial institution 702 get together to arrange a card-based payment plan according to the present invention, a funding algorithm or multiple algorithms are established depending on the number of plan offerings. After provider 502 provides a healthcare service, provider 502 swipes the employee's health card 602 using a POS-type device, for example, and inputs the retail amount of the claim or charge for the service. Financial institution 702 processes the charge by running the algorithm, which determines the employee's out-of-pocket exposure or payment responsibility based on a number of variables, including:
  the employee's deductible amount;
  the coinsurance percentage once the employee's deductible is met; and
  an out-of-pocket maximum representing the maximum total liability of the employee.

A transaction is approved or declined based on the total funds available on the employee's health card, which takes into account the following: a line of credit, if approved; the HSA, if the member elects to include that as part of the bucket of funds for payment; and the insurer's portion of the payment. In one example, the financial institution queries the account balance of the HSA in real time during or immediately after the swipe to confirm whether funds are available. The financial institution places a hold on the funds, and settlement may not occur in the customary time period for ordinary retail merchants. The hold may be extended, based on a mutually agreed upon time period with the insurer, until the adjudicated claim information for the transaction is received from the insurer. Also, settlement may occur for a discounted amount and not for the fully amount claimed.

According to one exemplary embodiment, the present invention is implemented using a closed-loop network (as it relates to healthcare), the financial institution owns and manages the network, and the financial institution is the issuing bank for the health cards. As such, the financial institution is able to assure payment of providers via this closed-loop network. Additionally, the financial institution is able to set rules specific to healthcare transactions at provider locations, including setting the amount of time that settlement may be extended while a claim is adjudicated and adjusting the treatment of card transactions submitted from the providers so a hold is placed on funds as assurance to the providers.

Optionally, the financial institution utilizes the closed-loop network to pass additional information along with the transaction, to assist in verifying member/employee eligibility for insurance coverage, for example, as well as data fields that will assist in matching a hold on funds with information on an adjudicated claim.

This aspect allows for both eligibility information and pre-population of fields from a provider's Practice Management (PM) system from a card swipe. In addition, it facilitates processing of payment to the provider and adjudication of claims. It allows for both real-time and batch processing of claims by estimating member liability (based on in or out-of network plan design information stored by the financial institution).

In the example shown in FIG. 13, following the rendering of service, provider 502 swipes the cardmember's card through a POS device. At step 1302, the card number and other identifying information is transmitted to financial institution 702. At step 1306, financial institution 702 retrieves the cardmember information from a database 1304 maintained by financial institution 702. Database 1304 contains cardmember information generated by financial institution 702 as well as health care plan data and cardmember eligibility information provided by insurer 506 at step 1308 and stored in database 1304 at step 1310. At step 1312, financial institution 702 sends the cardmember plan data and eligibility to a practice management system (PMS) 1314 maintained by provider 502. At step 1316, provider 502 keys in the charge for the service performed and sends the charge to financial institution 702. This charge may be a retail charge or it may be a charge based on the cardmember's plan data and eligibility information that was provided by financial institution 702 at step 1312. Upon receipt of the charge information, financial institution 702 places a hold on the cardmember account in the amount of the charge and sends an authorization code associated with the transaction to PMS 1314 at step 1318. At step 1320, PMS 1314 transmits a claim in the amount of the charge to insurer 506 along with the authorization code associated with the transaction generated by financial institution 702. Insurer 506 adjudicates the claim and at step 1322 sends the negotiated rate to financial institution 702 with the authorization code. Financial institution 702 matches the authorization code, reverses the hold on the cardmember's account and at step 1324 settles with provider 502 for the negotiated amount.

This allows financial institution 702 to immediately determine how much of the negotiated amount to withdraw from the cardmember's account and how much is payable by insurer 506.

This aspect of the invention allows for real-time claim substantiation and adjudication. It eliminates the need for a paper Explanation of Payments and accelerates cash flow for providers. It also reduces operating costs for health plans and eliminates the need for eligibility determination via phone or web inquiry.

Others have tried web-enabled solutions that allow for processing of claims but do not incorporate settlement of transactions or provide alternative sources for settlement on a real-time basis (e.g., line of credit (LOC)). This aspect of the present invention allows for adjudication and settlement for traditional insurance products as well as Consumer Driven Health Care ("CDHC") products. By transmitting member and health plan data directly into the practice management system, a provider is able to identify at the time of service not only the correct negotiated rate through real time adjudication, but also the patient liability to appropriately charge the patient at the time of service.

If the health plan cannot provide updated pricing and deductible data to facilitate real-time adjudication, transmitting this information directly into the practice management system will assist the provider in electronic claims submission. By including the authorization code with the claim, this will facilitate the matching for the financial institution's assured payment process.

Another aspect of the invention involves incentives to the cardmember for using a health card. Specifically, the financial institution offers incentives to the cardmember for usage of a payment card that is linked to pre-tax accounts like healthcare FSAs or HRAs. Incentives are either structured based on usage of the card (per transaction) or based on the amount spent (per charge volume). These points are accumulated over time, and when a certain threshold is reached they can be redeemed for specific goods or services. This concept can be further refined to offer varying levels of points based on eligible versus ineligible spend. This may be done through coordination between the card issuer and the TPA to share information regarding claims amounts processed for specific participants. Incentives are given at differing levels depending on the type of usage. For example, eligible spend that is automatically substantiated earns 2 points per $1 spent, eligible items that require manual substantiation earn 1 point per $1 spent, and ineligible spend earns 0 points. This feature helps to resolve the lack of correct usage of pre-tax programs by participants.

The incentive program aspect of the invention can be implemented in a number of ways. As one example, when a request for payment to a provider is submitted, the financial institution compares the SKU, UPC, merchant identifier, or any of a number of identifiers, of the charge to a database of qualifying identifiers. If the item being charged on the healthcare card qualifies for tax-advantaged treatment, the financial institution credits the FSA with an appropriate number of incentive points. Incentive points can be awarded by any one or more of the financial institution, the merchant, the manufacturer, the distributor of the item, etc. In one embodiment, the incentive points are accumulated in the tax-advantaged account and can be redeemed only for healthcare related rewards or for discounts on healthcare related items, such as physical fitness club memberships, athletic equipment, and healthcare merchant charges, such as, for example, doctor's visits, prescription drugs, etc.

Another aspect of the invention involves the transfer of points between tax-advantaged accounts. An employee or cardmember may change jobs during his/her career. This may also involve a change in healthcare plans and/or changing their tax-advantaged account to their new employer. If both the old account and the new account have incentive point programs associated with them, the employee may want to transfer points from their old account to their new account.

To accomplish this, the employee puts in a request to either the new or old employer (or the administrator of their FSA) or to the financial institution that controls the incentive points to effect the transfer. The institution or employer checks the new account to confirm that it is indeed a tax-advantaged account capable of participating in the incentive points program. If so, the institution transfers some or all of the points that have been accumulated in the first program to the new program.

In another embodiment, two employees or cardmembers may be participating in healthcare programs with tax-advantaged accounts. The employees are typically, but not necessarily family members, e;g., spouses or partners, children, parents, etc. The employees may participate in the same program through the same employer, or they may participate in the same program through two different employers, or they may participate in different programs through different employers. One family member may want to transfer points from their account to the other family member's participating tax-advantaged account. Again, the first (transferor) family member puts in a request to their employer (or FSA plan administrator) or the financial institution the controls the incentive points program for their plan to make the transfer. The institution or plan administrator, as appropriate, checks the second (transferee) family member's account to confirm that it is a tax-advantaged account that is capable of participating in the institution's incentive points program. If so, the institution transfers the requested number of accumulated points from the first family member's account to the second family member's account. Typically, but not necessarily, both tax-advantaged accounts are administered by the same entity. Also, typically, but not necessarily, the incentive points program for both accounts is administered by the same entity.

In still another aspect of the invention, two (or more) employees or cardmembers may participate in the same healthcare program with a single FSA. The two employees have their own healthcare cards that draw from the same FSA. If the FSA has an incentive points program associated with it, then both cardmembers can accumulate points for the same program by using their respective healthcare cards for tax-advantaged purchases. In this embodiment, the use of the respective healthcare cards to accumulate points is similar to the above-described embodiment in which a single cardmember accumulates points in their FSA program. In both embodiments, the healthcare card (or similar transaction instrument) may be issued by a merchant; alternatively, the transaction instrument may be issued by a financial institution (or other typical transaction instrument issuer).

It may be advantageous to incentivize employees to utilize a tax-advantaged account in connection with their healthcare programs. One way to accomplish this is to credit the employee's tax-advantaged account with incentive points. For example, for each dollar the employee contributes to their FSA, they will receive an award point (or a multiple of award points, depending on the program). The points can be awarded by the employer, the financial institution that issues the healthcare card, the institution that administers the FSA, etc.

In one embodiment, the invention is directed toward one or more computer systems capable of carrying out the functionality described herein. An example of a computer system 1400 is shown in FIG. 14.

Computer system 1400 includes one or more processors, such as processor 1404. Processor 1404 is connected to a communication infrastructure 1406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1400 can include a display interface 1402 that forwards graphics, text, and other data from communication infrastructure 1406 (or from a frame buffer not shown) for display on display unit 1416.

Computer system 1400 also includes a main memory 1408, preferably random access memory (RAM), and may also include a secondary memory 1410. Secondary memory 1410 may include, for example, a hard disk drive 1412 and/or a removable storage drive 1414, representing a floppy disk drive, a magnetic tape drive, an optical disk drive, etc. Removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, removable storage unit 1418 includes a computer usable storage medium having stored therein computer software and/or data.

In alternative embodiments, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCMCIA) slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (e.g., channel) 1426. This channel 1426 carries signals 1428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400. The invention is directed to such computer program products.

Computer programs (also referred to as computer control logic) are stored in main memory 1408 and/or secondary memory 1410. Computer programs may also be received via communications interface 1424. Such computer programs, when executed, enable computer system 1400 to perform the features of the present invention, as discussed herein. In particular, the computer programs, when executed, enable processor 1404 to perform the features of the present invention. Accordingly, such computer programs represent controllers of computer system 1400.

In an embodiment where the invention is implemented using software, the software may be stored in a computer program product and loaded into computer system 1400 using removable storage drive 1414, hard drive 1412 or communications interface 1424. The control logic (software), when executed by processor 1404, causes processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention (e.g., packaging and activation of other transaction cards and/or use of batch activation processes). Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    linking, using a computing device, an existing transaction instrument, associated with a non tax-advantaged account, to a tax-advantaged account;
    receiving, using the computing device, a request, initiated by a use of the transaction instrument, for payment of a purchase;
    determining, using the computing device, whether the purchase qualifies for pre-tax treatment; and
    in response to a determination that the purchase qualifies for pre-tax treatment:
        determining, using the computing device, at least a partial payment amount to be paid from the tax-advantaged account,
        initiating, using the computing device, a debit of the tax-advantaged account, and
        transmitting, using the computing device, the at least the partial payment.

2. The method of claim 1, wherein the at least the partial payment amount is transmitted concurrently with the debit of the tax-advantaged account.

3. The method of claim 1, wherein the at least the partial payment amount is transmitted to a service provider.

4. The method of claim 1, wherein the at least the partial payment amount is transmitted to a retail merchant.

5. The method of claim 1, wherein the at least the partial payment amount is transmitted to a third party intermediary.

6. The method of claim 1, wherein the tax-advantaged account is a Flexible Spending Account (FSA).

7. The method of claim 1, wherein the tax-advantaged account is a Health Savings Account (HSA).

8. The method of claim 1, wherein the transaction instrument is at least one of:
    a debit card; or
    a credit card.

9. An article of manufacture including a tangible computer readable medium having instructions stored thereon, execution of which by a computing device causes the computing device to perform operations comprising:
    linking an existing transaction instrument, associated with a non tax-advantaged account, to a tax-advantaged account;
    receiving, a request, initiated by a use of the transaction instrument, for payment of a purchase;
    determining whether the purchase qualifies for pre-tax treatment; and
    in response to a determination that the purchase qualifies for pre-tax treatment:
        determining at least a partial payment amount to be paid from the tax-advantaged account,
        initiating a debit of the tax-advantaged account, and
        transmitting the at least the partial payment amount.

10. The article of manufacture of claim 9, wherein the tax-advantaged account is a Flexible Spending Account (FSA).

11. The article of manufacture of claim 9, wherein the tax-advantaged account is a Health Savings Account (HSA).

12. The article of manufacture of claim 9, wherein the transaction instrument is at least one of:
    a debit card; or
    a credit card.

13. A system comprising:
    a processor; and
    a memory storing instructions, execution of which by a computing device causes the computing device to perform operations comprising:
        linking an existing transaction instrument, associated with a non tax-advantaged account, to a tax-advantaged account;
        receiving, a request, initiated by a use of the transaction instrument, for payment of a purchase;
        determining whether the purchase qualifies for pre-tax treatment; and
        in response to a determination that the purchase qualifies for pre-tax treatment:
            determining at least a partial payment amount to be paid from the tax-advantaged account,
            initiating a debit of the tax-advantaged account, and
            transmitting the at least the partial payment amount.

14. The system according to claim 13, wherein the tax-advantaged account is a Flexible Spending Account (FSA).

15. The system of claim 13, wherein the tax-advantaged account is a Health Savings Account (HSA).

16. The system of claim 13, wherein the transaction instrument is at least one of:
    a debit card; or
    a credit card.

17. A system comprising:
    means for linking an existing transaction instrument, associated with a non tax-advantaged account, to a tax-advantaged account;

means for receiving a request, initiated by a use of the transaction instrument, for payment of a purchase;

means for determining whether the purchase qualifies for pre-tax treatment;

means for determining, in response to a determination that the purchase qualifies for pre-tax treatment, at least a partial payment amount to be paid from the tax-advantaged account;

means for initiating, in response to the determination that the purchase qualifies for pre-tax treatment, a debit of the tax-advantaged account; and means for transmitting, in response to the determination that the purchase qualifies for pre-tax treatment, the at least the partial payment amount.

18. The system of claim 17, wherein the tax-advantaged account is a Flexible Spending Account (FSA).

19. The system of claim 17, wherein the tax-advantaged account is a Health Savings Account (HSA).

20. The system of claim 17, wherein the transaction instrument is at least one of:
   a debit card; or
   a credit card.

* * * * *

UNITED STATES PATENT AND TRADEMARK OFFICE
CERTIFICATE OF CORRECTION

| | |
|---|---|
| PATENT NO. | : 7,922,083 B2 |
| APPLICATION NO. | : 11/461389 |
| DATED | : April 12, 2011 |
| INVENTOR(S) | : Harrison et al. |

It is certified that error appears in the above-identified patent and that said Letters Patent is hereby corrected as shown below:

Title page, item (65), under "Prior Publication Data", in Column 1, Line 1, delete "US 2007/0194109 A1 Aug. 23, 2007" and insert -- US 2010/0116882 A9 May 13, 2010
US 2007/0194109 A1 Aug. 23, 2007 --.

Title page, item (63), under "Related U.S. Application Data" in Column 1, Lines 4-5, delete "2005, application No. 11/461,389, filed on Jul. 31, 2006." and insert -- 2005. --.

Title page, item (57), under "Abstract", in Column 2, Line 3, delete "requester." and insert -- requestor. --.

Page 3, item (56), under "Other Publications", in Column 2, Lines 1-2, delete "IG1-66668508" and insert -- 1G1-66668508 --.

Column 29, line 60, in Claim 1, delete "payment." and insert -- payment amount. --.

Column 30, line 19, in Claim 9, delete "receiving," and insert -- receiving --.

Column 30, line 46, in Claim 13, delete "receiving," and insert -- receiving --.

Column 30, line 56, in Claim 14, delete "according to" and insert -- of --.

Signed and Sealed this
Twentieth Day of September, 2011

David J. Kappos
*Director of the United States Patent and Trademark Office*